(12) United States Patent
Kagawa et al.

(10) Patent No.: US 7,136,190 B2
(45) Date of Patent: Nov. 14, 2006

(54) COLOR CONVERSION APPARATUS AND COLOR CONVERSION METHOD

(75) Inventors: Shuichi Kagawa, Tokyo (JP); Hiroaki Sugiura, Tokyo (JP); Junichi Nose, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1051 days.

(21) Appl. No.: 10/168,628

(22) PCT Filed: Apr. 13, 2001

(86) PCT No.: PCT/JP01/03194

§ 371 (c)(1),
(2), (4) Date: Jun. 24, 2002

(87) PCT Pub. No.: WO02/084994

PCT Pub. Date: Oct. 24, 2002

(65) Prior Publication Data

US 2003/0081231 A1  May 1, 2003

(51) Int. Cl.
B41J 1/00 (2006.01)
G06F 15/00 (2006.01)
G03F 3/08 (2006.01)
G06K 9/00 (2006.01)

(52) U.S. Cl. .............. 358/1.9; 358/520; 382/162; 382/167

(58) Field of Classification Search .......... 358/1.9, 358/520; 382/162, 167
See application file for complete search history.

(56) References Cited

U.S. PATENT DOCUMENTS

| 4,740,833 A | 4/1988 | Shiota et al. |
| 4,887,150 A | 12/1989 | Chiba et al. |
| 4,989,079 A * | 1/1991 | Ito ............................ 358/520 |
| 5,077,606 A | 12/1991 | Hatabe et al. |
| 5,241,373 A * | 8/1993 | Kanamori et al. .......... 348/645 |
| 5,436,733 A | 7/1995 | Terada et al. |
| 5,633,953 A | 5/1997 | Kouzaki |
| 5,659,406 A | 8/1997 | Imao et al. |
| 5,933,252 A | 8/1999 | Emori et al. |

(Continued)

FOREIGN PATENT DOCUMENTS

EP  1028586 A  8/2000

(Continued)

OTHER PUBLICATIONS

U.S. Appl. No. 09/293,180, filed Apri. 16, 1999, Asamura et al.

(Continued)

Primary Examiner—Kimberly Williams
Assistant Examiner—Charlotte M. Baker
(74) Attorney, Agent, or Firm—Birch Stewart Kolasch & Birch, LLP

(57) ABSTRACT

A conventional color conversion apparatus was associated with a problem of generation of an achromatic component and reduction in the luminance.

A color conversion apparatus according to the present invention generates new color data corresponding to color red of red, green and blue by means of matrix calculation using a first calculation term which is effective for just one of the hues of red, yellow, blue, green, cyan, magenta and yellow, and a second calculation term which is calculated from the first calculation term and which is effective for a predetermined inter-hue region included in at least one of inter-hue zones of red-yellow, yellow-green, green-cyan, cyan-magenta, and magenta-red, so that color conversion can be achieved without generation of an unnecessary achromatic component or reduction in the luminance.

32 Claims, 24 Drawing Sheets

U.S. PATENT DOCUMENTS

| | | |
|---|---|---|
| 6,008,912 A | 12/1999 | Sato et al. |
| 6,125,202 A | 9/2000 | Kagawa et al. |
| 6,766,049 B1 * | 7/2004 | Asamura et al. ............ 382/162 |

FOREIGN PATENT DOCUMENTS

| | | |
|---|---|---|
| JP | 58-104754 | 6/1983 |
| JP | 63-227181 | 9/1988 |
| JP | 2-30226 | 7/1990 |
| JP | 5-48885 | 2/1993 |
| JP | 5-183742 | 7/1993 |
| JP | 7-23245 | 1/1995 |
| JP | 7-170404 | 4/1995 |
| JP | 8-321964 | 12/1996 |
| JP | 11-17974 | 1/1999 |
| JP | 63-39188 | 1/1999 |
| JP | 11-308472 | 11/1999 |

OTHER PUBLICATIONS

U.S. Appl. No. 09/457,703, filed Dec. 9, 1999, Kagawa et al.

* cited by examiner

COLOR CONVERSION APPARATUS AND COLOR CONVERSION METHOD

This application is the national phase under 35 U.S.C. § 371 of PCT International Application No. PCT/JP01/03194 which has an International filing date of Apr. 13, 2001, which designated the United States of America.

TECHNICAL FIELD

The present invention relates to a color conversion apparatus and a color conversion method for converting color data representing colors of color images, in accordance with characteristics of an image output device such as an image display device or printer, when color images represented by three primary colors of red, green and blue are output to the image output device.

BACKGROUND ART

Color conversion is conducted for converting color data of input images when images are displayed by means of three primary colors of red, green and blue because color reproducibility of images differ depending on the characteristics of the display device. The color conversion apparatus described in Japanese Patent Kokai Publication No. 2000-287074 generates calculation terms which are effective for a specific hue or inter-hue region from color data of red, green and blue, and generates converted color data by means of matrix calculation multiplying the calculation terms by predetermined matrix coefficients. The matrix calculation for the color conversion is represented by the following formula (1):

$$\begin{bmatrix} Ro \\ Go \\ Bo \end{bmatrix} = (Eij) \begin{bmatrix} r \\ g \\ b \end{bmatrix} + (Fij) \begin{bmatrix} c \times m \\ m \times y \\ y \times c \\ r \times g \\ g \times b \\ b \times r \\ h1r \\ h1g \\ h1b \\ h1m \\ h1y \\ h1c \\ h2ry \\ h2rm \\ h2gy \\ h2gc \\ h2bm \\ h2bc \end{bmatrix} \quad (1)$$

In the formula (1), r, g and b denote calculation terms corresponding to color components of red, green and blue. m×y and h1r; y×c and h1g; c×m and h1b; b×r and h1m; r×g and h1y; and g×b and h1c are calculation terms which are respectively effective for hues of red, green, blue, magenta, yellow and cyan. h2ry, h2yg, h2gc, h2cb, h2bm and h2mr are calculation terms which are respectively effective for inter-hue regions of red-yellow, yellow-green, green-cyan, cyan-blue, blue-magenta and magenta-red. Inter-hue region "red-yellow" for example means the region which exists in an inter-hue zone from red to yellow.

For instance, if the hue of yellow of the input image is to be converted to "reddish yellow," a calculation term effective for the hue yellow is subtracted from the calculation term g corresponding to the green component. If the hue of green is to be converted to "bluish green," a calculation term effective for the hue green is added to the calculation term b corresponding to the blue component. Moreover, by adding or subtracting calculation terms effective for a certain inter-hue region in an inter-hue zone yellow-green, to or from calculation terms r, g and b corresponding to red, blue, and green components, desired color can be displayed.

FIG. 1 shows the functions of each calculation term in the matrix calculation represented by the formula (1). FIG. 1 schematically illustrates the calculation terms r, g and b on the assumption that the matrix coefficients Eij in the formula (1) constitute a unit matrix. "$\Delta h1y$" schematically represents a calculation term effective for hue yellow, and "$\Delta h1g$" schematically represents a calculation term effective for hue green, "$\Delta h2yg1$," and "$\Delta h2yg2$" schematically represent calculation terms effective for inter-hue regions in the inter-hue zone yellow-green. $\Delta h2yg1$ is subtracted from the calculation term r, while $\Delta h1y$ is subtracted from the calculation term g, and $\Delta h1g$ and $\Delta h2yg2$ are respectively added to and subtracted from the calculation term b. By the above-described calculations, the conversion characteristics shown in FIG. 2 is obtained. Ro, Go and Bo in FIG. 2 respectively show conversion characteristics of color data red, green and blue. When the green component is reduced in the hue yellow, "reddish yellow" results as shown in FIG. 2(G). When the blue component is increased in the hue green, "bluish green" results as shown in FIG. 2(B).

The conventional color conversion apparatus has a problem in that the color conversion is associated with reduction in the luminance. That is, as shown in FIG. 2, by reducing the green component in the hue yellow, the luminance is reduced in the inter-hue region of yellow-green. (As shown in FIG. 1, the color component g before the conversion, is maximum from yellow to green.)

Moreover, the conventional color conversion apparatus has a problem in that the color conversion is associated with generation of an achromatic component. FIG. 3 shows another conversion characteristics obtained when the matrix coefficient for each calculation term shown in FIG. 1 is adjusted. According to the conversion characteristics shown in FIG. 3, the luminance is not lowered, but none of R1, G1 and B1 is zero in the inter-hue region yellow-green, so that the achromatic component is generated.

The present invention has been made to solve the problem described above, and its object is to provide a color conversion apparatus and color conversion method for correcting the desired hue, without generating an achromatic component and without lowering the luminance.

DISCLOSURE OF INVENTION

A first color conversion apparatus and color conversion method according to the invention generates new color data corresponding to color data of red, green and blue by means of matrix calculation using a first calculation term which is effective for at least one of the hues of red, blue, green, cyan, magenta and yellow, and a second calculation term which is calculated from the first calculation term, and is effective for an inter-hue region included in one of inter-hue zones of red-yellow, yellow-green, green-cyan, cyan-blue, blue-magenta and magenta-red. Accordingly, color conversion can be achieved without generating an unnecessary achromatic component and reduction of luminance.

A second color conversion and color conversion method according to the invention generates complementary color data of yellow, magenta and cyan corresponding to color data of red, green and blue, by means of matrix calculation using a first calculation term which is effective for at least one of the hues of red, blue, green, cyan, magenta and yellow, and a second calculation term which is calculated from the first calculation term, and is effective for an inter-hue region included in one of inter-hue zones of red-yellow, yellow-green, green-cyan, cyan-blue, blue-magenta and magenta-red. Accordingly, color conversion can be achieved without generating an unnecessary achromatic component and reduction of density.

A third color conversion apparatus and color conversion method according to the invention generates new color data corresponding to color data of red, green and blue by means of matrix calculation using a first calculation term which is effective for at least one of the hues of red, blue, green, cyan, magenta and yellow, a second calculation term which is calculated from the first calculation term, and is effective for an inter-hue region included in one of inter-hue zones of red-yellow, yellow-green, green-cyan, cyan-blue, blue-magenta, and magenta-red, and achromatic color data representing an achromatic component. Accordingly, color conversion can be achieved without generating an unnecessary achromatic component and reduction of luminance, and an achromatic component can be adjusted independently.

A fourth color conversion and color conversion method according to the invention generates complementary color data of yellow, magenta and cyan corresponding to color data of red, green and blue, by means of matrix calculation using a first calculation term which is effective for at least one of the hues of red, blue, green, cyan, magenta and yellow, a second term, and is effective for an inter-hue region included in one of inter-hue zones of red-yellow, yellow-green, green-cyan, cyan-blue, blue-magenta and magenta-red, and achromatic color data representing an achromatic component. Accordingly, color conversion can be achieved without generating an unnecessary achromatic component and reduction of density, and an achromatic component can be adjusted independently.

BEST MODE FOR CARRYING OUT THE INVENTION

Embodiment 1.

Figure 4:
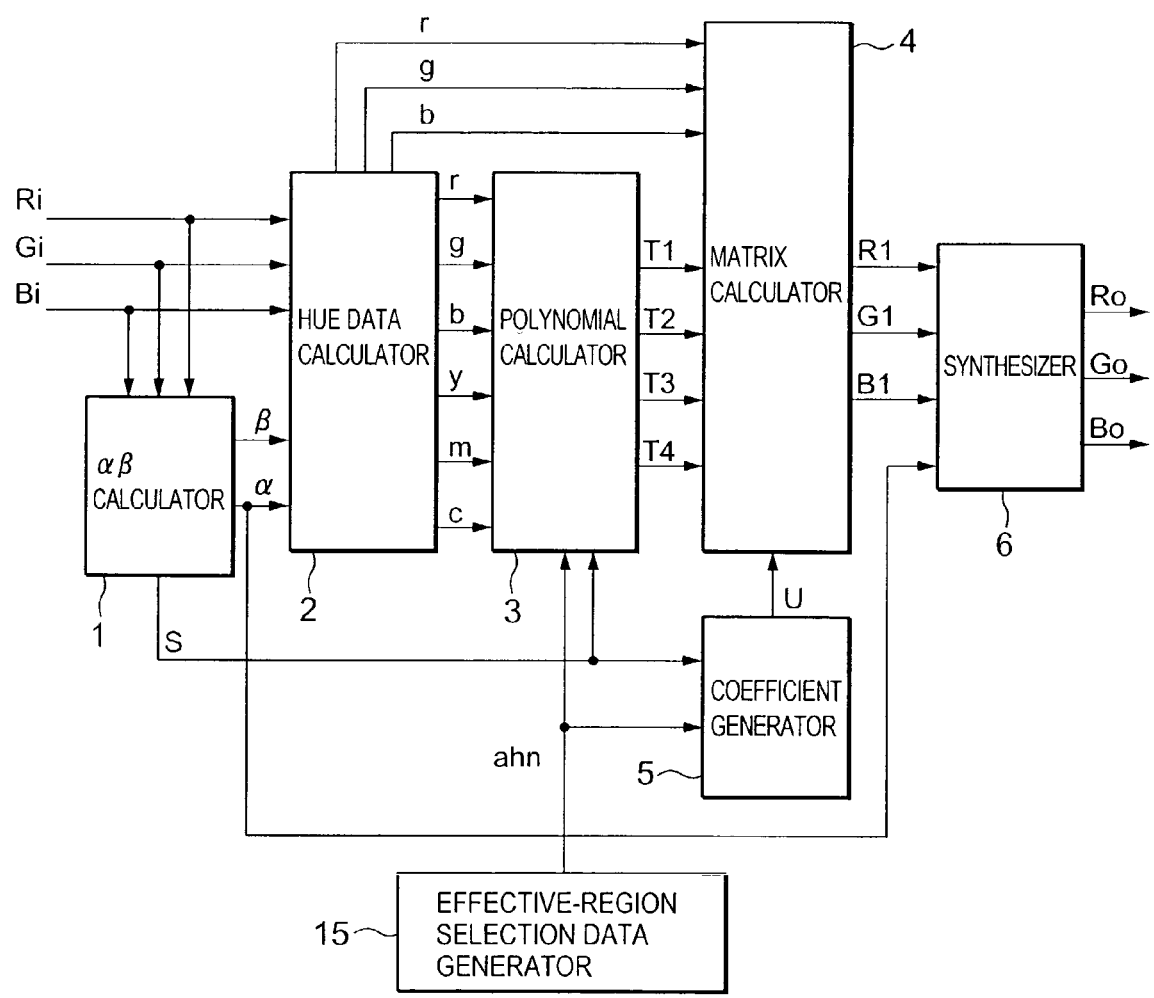
FIG. 4 shows the configuration of a color conversion apparatus of Embodiment 1.

FIG. 4 shows the configuration of a color conversion apparatus according to this embodiment.

An $\alpha\beta$ calculator 1 which generates an identification code S identifying the color represented by input color data Ri, Gi and Bi, and supplies the identification code S to a polynomial calculator 3, and a coefficient generator 5. A hue data calculator 2 generates six hue data r, g, b, y, m and c corresponding to red, green, blue, yellow, magenta and cyan, based on the color data Ri, Gi and Bi. The color data color data Ri, Gi and Bi correspond to pixel data representing one pixel by means of red, blue and green.

The polynomial calculator 3 generates polynomial data T1, T2, T3 and T4 used in matrix calculation for color conversion, based on the hue data r, g, b, y, m and c. The polynomial data T1 is a calculation term effective for the hue red, green, or blue, and T2 is a calculation term effective for the hue magenta, yellow, or cyan. The polynomial data T3 and T4 are calculation terms effective for specific inter-hue region in an inter-hue zone red-yellow, yellow-green, green-cyan, cyan-blue, blue-magenta, or magenta-red. An effective-region selection data generator 15 outputs effective-region selection data ahn designating the inter-hue regions for which the polynomial data T3 and T4 are effective. That is, the inter-hue regions for which the polynomial data T3 and T4 are effective are designated by the effective-region selection data ahn.

Next, components of the color conversion apparatus shown in FIG. 4 are described one by one.

1. αβ Calculator

The αβ calculator 1 outputs a minimum value α and a maximum value β of the input color data Ri, Gi and Bi. It also outputs an identification code S which identifies the inter-hue zone in which the color represented by the color data Ri, Gi and Bi exists. Here, β=max(Ri, Gi, Bi), α=min (Ri, Gi, Bi). The minimum value α and the maximum value β can be generated using a magnitude comparison circuit, a selector circuit, and the like. The relationship between the inter-hue region identified by the identification code S, and the minimum value α, and the maximum value β is shown in the following Table 1.

TABLE 1

| INTER-HUE ZONE | ID CODE S | MAXIMUM VALUE β | MINIMUM VALUE α |
| --- | --- | --- | --- |
| MAGENTA-RED | 1 | Ri | Gi |
| RED-YELLOW | 2 | Ri | Bi |
| GREEN-CYAN | 3 | Gi | Ri |
| YELLOW-GREEN | 4 | Gi | Bi |
| CYAN-BLUE | 5 | Bi | Ri |
| BLUE-MAGENTA | 6 | Bi | Gi |

As shown in Table 1, when, among the color data Ri, Gi and Bi, Ri is the maximum value β, and Gi is the minimum value α, the color data Ri, Gi and Bi represent a color in the inter-hue zone of magenta-red. The αβ calculator 1 outputs "1" as the identification code S for the color data.

2. Hue Data Calculator

The hue data calculator 2 calculates the six hue data r, g, b, y, m and c from the color data Ri, Gi and Bi, and the minimum value α, and the maximum value β output from the αβ calculator 1. The hue data are calculated by:

r=Ri−α,
g=Gi−α,
b=Bi−α,
y=β−Bi,
m=β−Gi, and
c=β−Ri.

Figure 5:
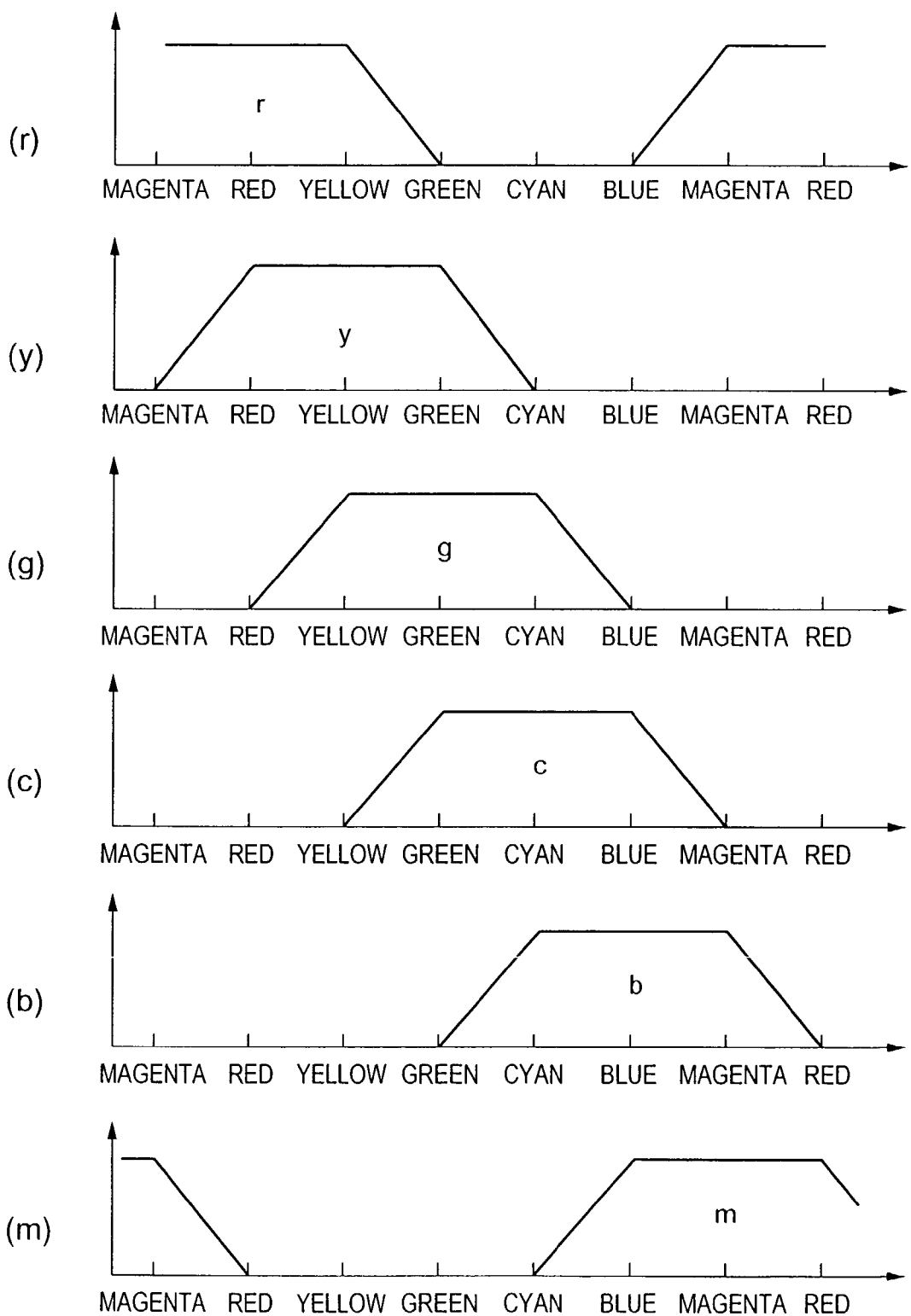
FIG. 5 schematically illustrates the relationship between hue data and hues.

FIG. 5 schematically illustrates the relationship between the six hues of red, green, blue, yellow, cyan, magenta, and the hue data r, g, b, y, m and c.

3. Polynomial Calculator

Based on the hue data r, g, b, y, m and c calculated by the hue data calculator 2, the polynomial calculator 3 calculates the polynomial data T1, T2, T3 and T4, which are used for matrix calculation for the color conversion. As described earlier, T1 denotes a calculation term effective for the hue red, green, or blue, and T2 denotes polynomial data effective for the hue yellow, magenta, or cyan. The polynomial data T3 and T4 are calculation terms effective for specific inter-hue regions in the inter-hue zone of red-yellow, yellow-green, green-cyan, cyan-blue, blue-magenta, or magenta-red. These polynomial data T1 to T4 are generated in accordance with the inter-hue zone in which the color represented by the input color data Ri, Gi and Bi exists. A method of calculating the polynomial data T1 to T4 is next described.

3-1 Method of Calculating the polynomial data T1 and T2.

Figure 6:
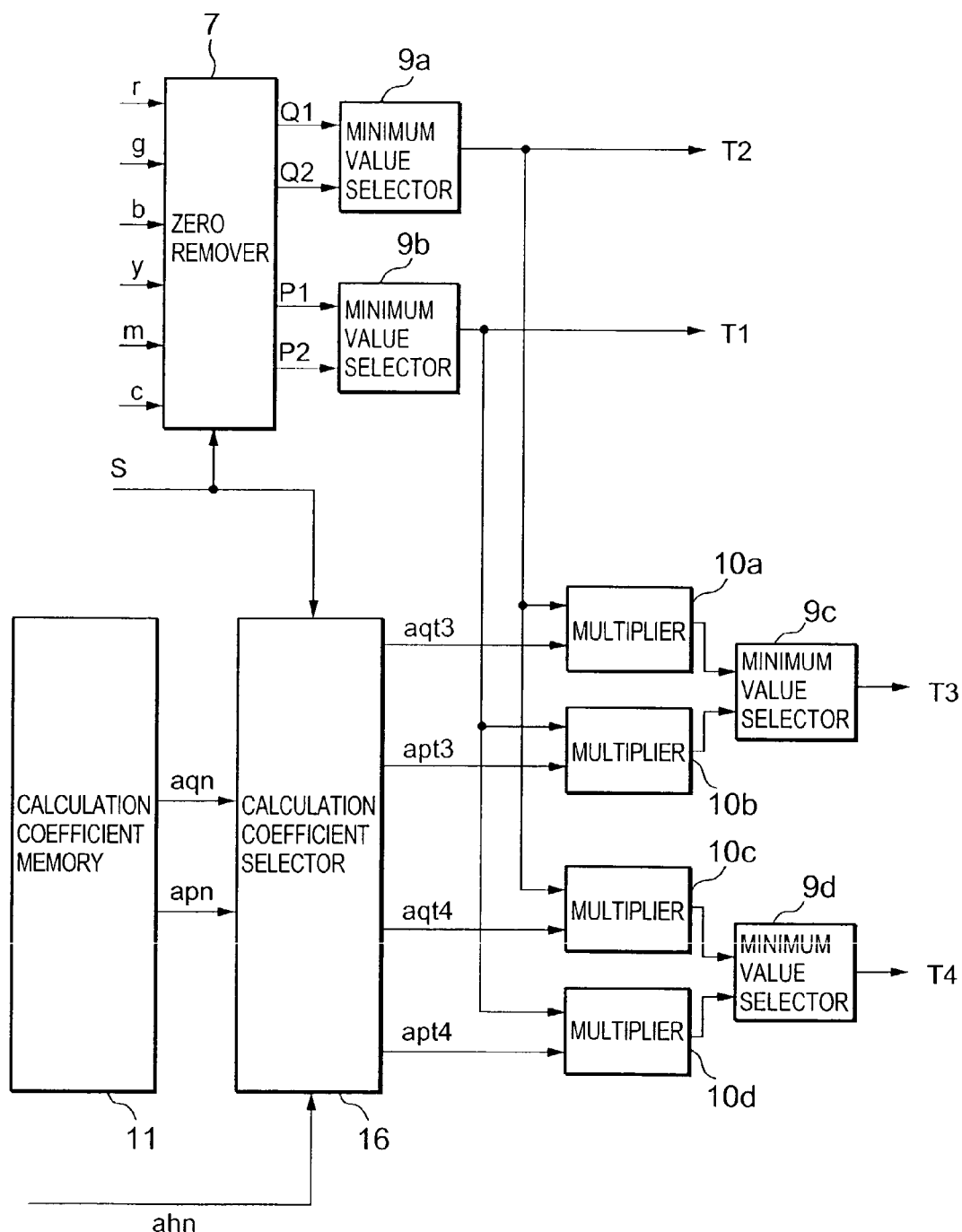
FIG. 6 shows the internal configuration of a polynomial calculator.

FIG. 6 shows the internal configuration of the polynomial calculator 3. The hue data r, g, b, y, m and c are input to mover 7. The hue data r, g, b, and the hue data y, m and c have such a characteristics that at least one of them is zero. The zero remover 7 outputs two of the hue data r, g, b that are not zero, as Q1 and Q2, and outputs two of the hue data y, m and c that are not zero, as P1 and P2. The relationship between the identification code S, and P1 and P2, Q1 and Q2, and the hue data which are zero is as shown in the following Table 2.

TABLE 2

| ID CODE S | Q1 | Q2 | P1 | P2 | HUE DATA THAT ARE ZERO |
| --- | --- | --- | --- | --- | --- |
| 1 | r | b | m | y | g, c |
| 2 | r | g | y | m | b, c |
| 3 | g | b | c | y | r, m |
| 4 | g | r | y | c | b, m |
| 5 | b | g | c | m | r, y |
| 6 | b | r | m | c | g, y |

As shown in Table 2, when for instance, the color represented by the color data Ri, Gi and Bi exists in the inter-hue zone magenta-red, the value of the identification code S is set to "1," and the hue data g, c are zero.

The minimum value selector 9a outputs the smaller one of Q1 and Q2, as the polynomial data T2, while the minimum value selector 9b outputs the smaller one of P1 and P2, as the polynomial data T1. Here, T1=min(P1, P2), T2=min(Q1, Q2). That is, the polynomial data T1 is calculated based on the two non-zero hue data among the hue data y, m and c, while the polynomial data T2 is calculated based on the two non-zero hue data among the hue data r, g, b.

Figure 7:
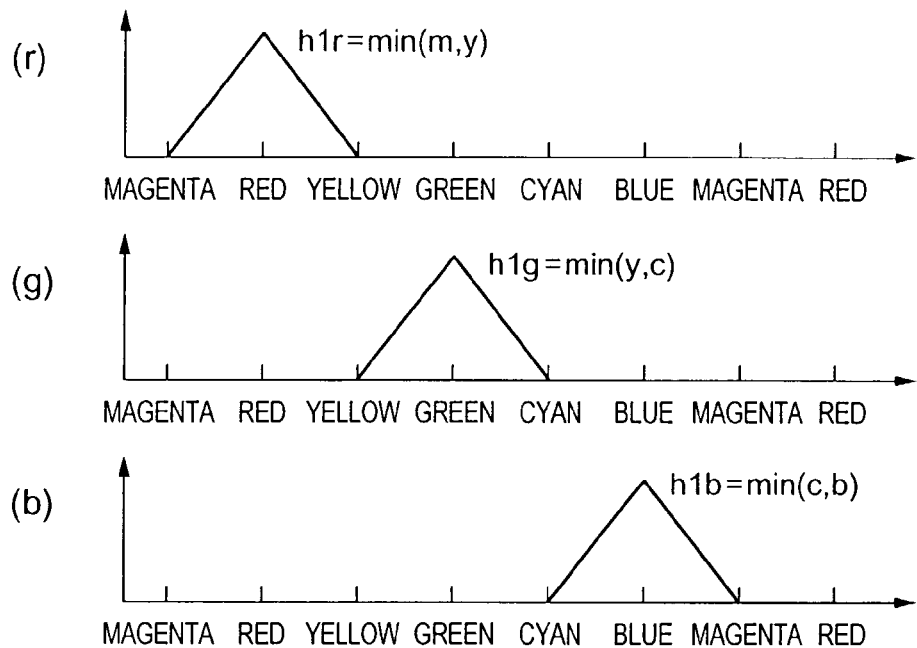
FIG. 7 schematically illustrates the relationship between polynomial data T1 and hues.

FIG. 7 schematically illustrates the relationship between the polynomial data T1 and the hues. h1*r*, h1*g* and h1*b* respectively denote the polynomial data T1 which are respectively effective for red, green and blue. As shown in FIG. 7, the polynomial data T1 is a calculation term which is effective for the hue red, blue, or green. The polynomial data h1*r*, h1*g* and h1*b* are calculated by the following formula (2).

$$\left.\begin{array}{l} h1r = \min(m, y) \\ h1g = \min(y, c) \\ h1b = \min(c, m) \end{array}\right\} \quad (2)$$

Figure 8:
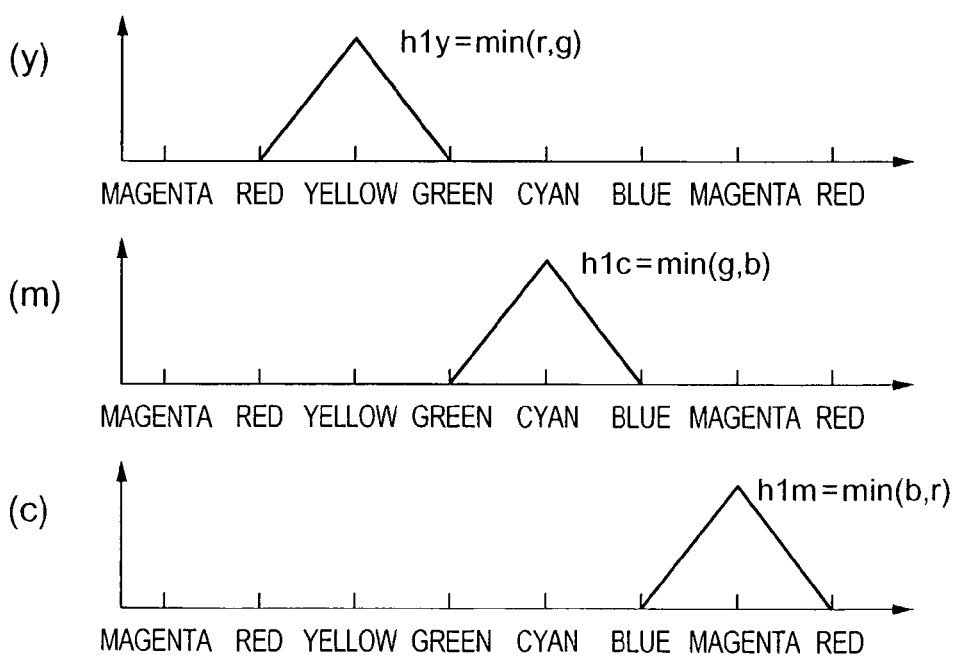
FIG. 8 schematically illustrates the relationship between polynomial data T2 and hues.

FIG. 8 schematically illustrates the relationship between the polynomial data T2 and the hues. h1*y*, h1*m*, h1*c* respectively denote the polynomial data T2 which are respectively effective for yellow, magenta and cyan. As shown are effective for the hue yellow, magenta, or cyan.

The polynomial data T2 are calculated by the following formula.

$$\left.\begin{array}{l} h1y = \min(r, g) \\ h1c = \min(g, b) \\ h1m = \min(b, r) \end{array}\right\} \quad (3)$$

The polynomial data T1 (h1*r*, h1*g*, h1*b*), and T2 (h1*y*, h1*c*, h1*m*) are generated in accordance with the identification code S. The relationship between the identification code S, and the polynomial data T1 and T2 is shown in the following Table 3.

TABLE 3

| ID CODE S | T1 | T2 |
|---|---|---|
| 1 | h1r | h1m |
| 2 | h1r | h1y |
| 3 | h1g | h1c |
| 4 | h1g | h1y |
| 5 | h1b | h1c |
| 6 | h1b | h1m |

Figure 9:
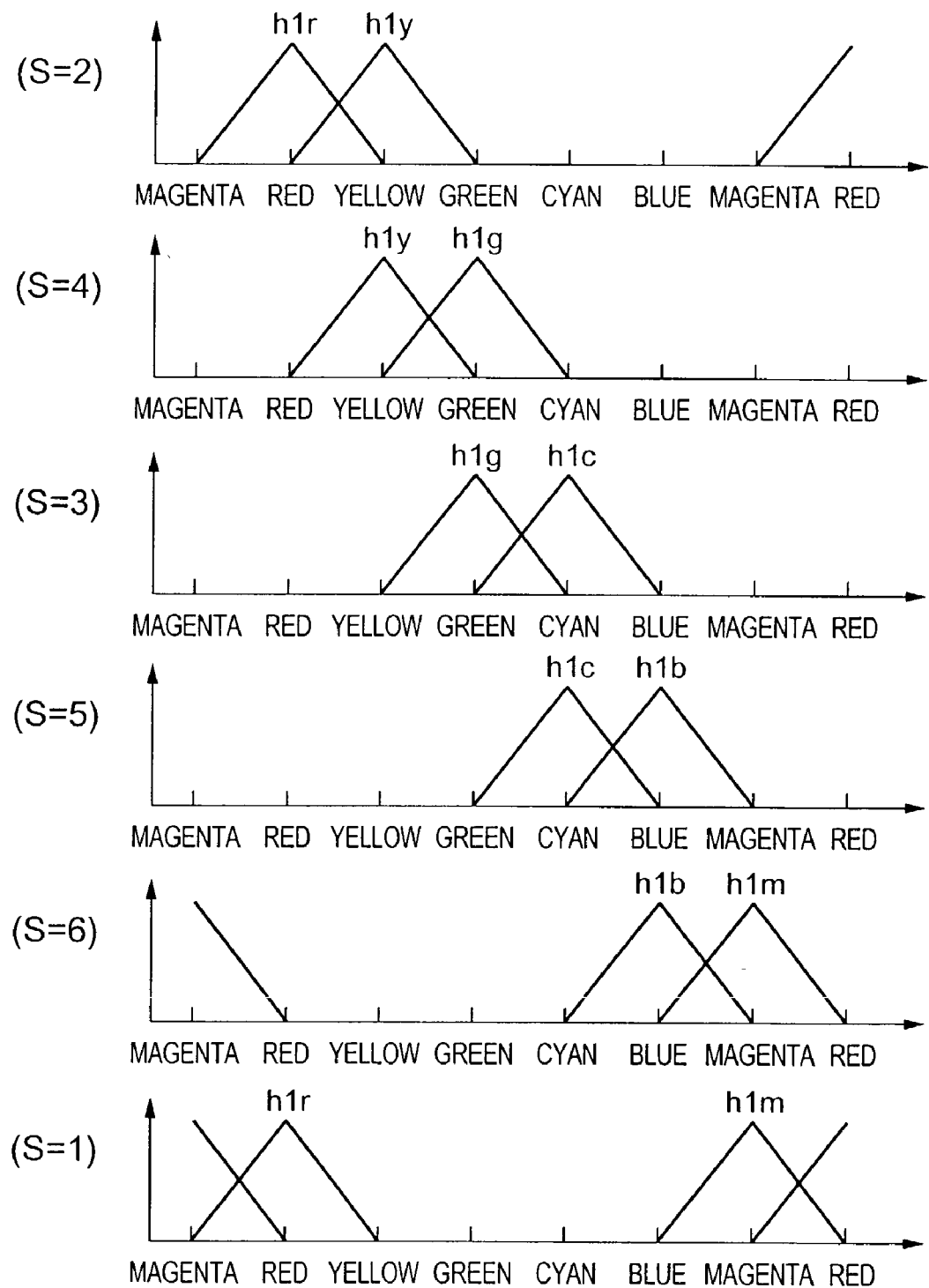
FIG. 9 shows the relationship between polynomial data T1 and T2, and an identification code S.

As shown in Table 3, when the color represented by the color data Ri, Gi, and Bi exists in the inter-hue zone magenta-red corresponding to the identification code S=1, h1r and h1m are generated respectively as the polynomial data T1 and T2. FIG. 9 shows the relationship between the identification code S, and the polynomial data T1 and T2.

3-2 Method of calculation of Polynomial data T3 and T4

As shown in FIG. 6, the polynomial data T1 is input to multipliers 10b and 10d, and the polynomial data T2 is input to the multipliers 10a and 10c. A calculation coefficient selector 16 outputs the calculation coefficients apt3, aqt3, apt4 and aqt4 by the identification code S, and the effective-region selection data ahn (n=1 to m) to multipliers 10b, 10a, 10d and 10c, respectively.

The multipliers 10b and 10a output the products apt3×T1 and aqt3×T2 obtained by multiplying the polynomial data T1 and T2, by the calculation coefficients apt3 and aqt3, to the minimum value selector 9c. The minimum value selector 9c outputs the smaller one of apt3×T1 and aqt3×T2 as the second comparison-result data T3. When generalized, the polynomial data T3 can be expressed as T3=min(apt3×T1, aqt3×T2 ).

The multipliers 10d and 10c output the products apt4×T1 and aqt4×T2 obtained by multiplying the polynomial data T1 and T2 by the calculation coefficients apt4 and aqt4, to the minimum value selector 9d. The minimum value selector 9d outputs the smaller one of apt4×T1 and aqt4×T2, as the polynomial data T4. When generalized, the polynomial data T4 can be expressed as T4 =min(apt4×T1, aqt4×T2 ).

Figure 10:
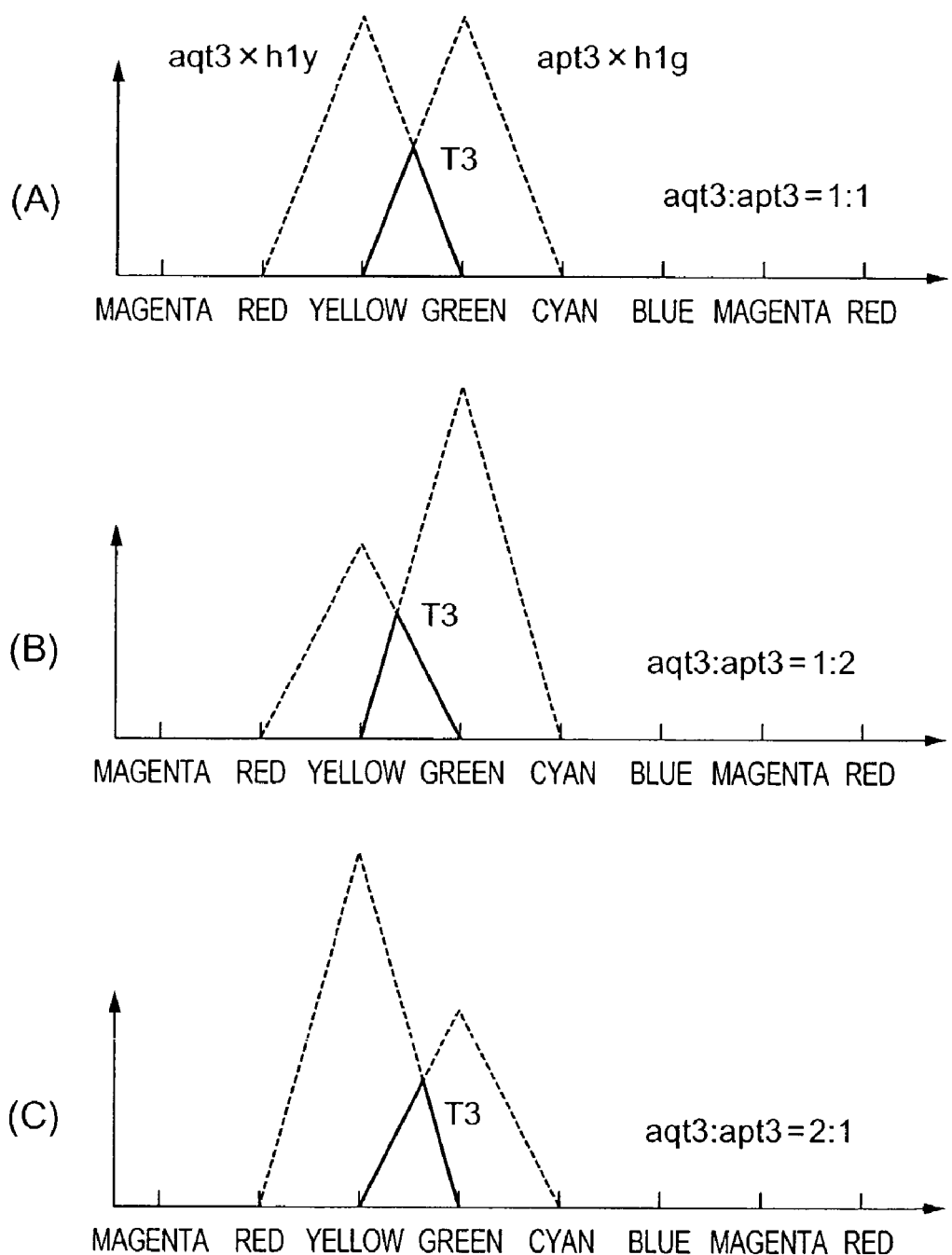
FIG. 10 schematically illustrates an example of polynomial data T3.
Figure 11:
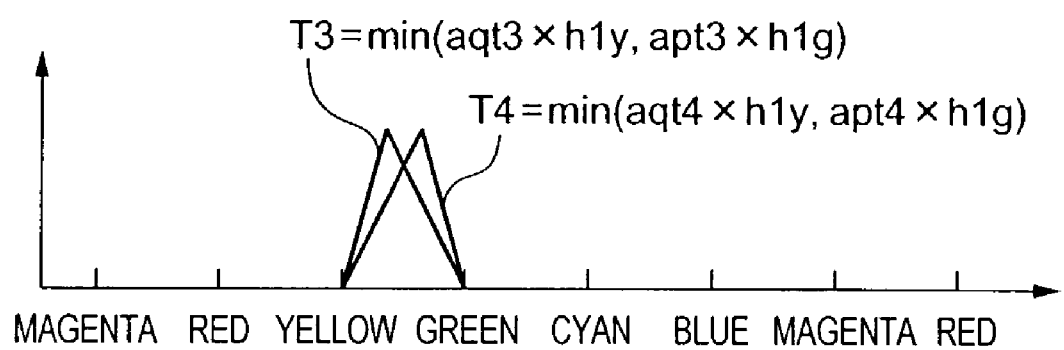
FIG. 11 schematically illustrates an example of polynomial data T3 and T4.

FIG. 10 shows an example of the polynomial data T3. FIGS. 10(A), (B) and (C) respectively shows the polynomial data T3 when the identification code S is 4 (that is, the color data Ri, Gi and Bi represents a color in the inter-hue zone of yellow-green), and the calculation coefficient aqt3 and apt3 are such that aqt3:apt3=1:1, 1:2 and 2:1, respectively. When the identification code S is 4, T1=h1g, and T2=h1y (see Table 3 and FIG. 9). Accordingly, T3=min(aqt3×h1y, apt3×h1g). When the calculation coefficients are such that aqt3:apt3=1:1, the polynomial data T3 which is effective in the inter-hue region in the middle of the inter-hue zone yellow-green, as shown in FIG. 10(A) is generated. When the calculation coefficients are such that aqt3:apt3=1:2, the polynomial data T3 which is effective in the inter-hue region near the hue yellow in the inter-hue zone yellow-green, as shown in FIG. 10(B) is generated. When the calculation coefficients are such that aqt3:apt3=2:1, the polynomial data T3 which is effective in the inter-hue region near the hue green in the inter-hue zone yellow-green, as shown in FIG. 10(C) is generated. The polynomial data T4 is similarly calculated. If the calculation coefficients for the polynomial data T3 and T4 are such that aqt3:apt3=1:2 and aqt4:apt4=2:1 (and if aqt3=apt4), the polynomial data T3 and T4 shown in FIG. 11 are output from the minimum value selectors 9c and 9d. By generating the two polynomial data which are effective for the inter-hue region near the hue yellow in the inter-hue zone yellow-green, and the inter-hue region near the hue green in the inter-hue zone yellow-green, as shown in FIG. 10, it is possible, in the color conversion, to adjust the inter-hue region near yellow, and the inter-hue region near green, independently.

3.3 Calculation Coefficient Selector

The calculation coefficient selector 16 (FIG. 6) selects the calculation coefficients aqt3, apt3, aqt4 and apt4 which determine the inter-hue region for which the polynomial data T3 and T4 are effective in the inter-hue zone red-yellow, yellow-green, green-cyan, cyan-blue, blue-magenta, or magenta-red. The calculation coefficient selector 16 selects the coefficients aqn and apn (n=1 to m) stored in the calculation coefficient memory 11, based on the identification code S, and the effective-region selection data ahn (n=1 to m), and outputs the selected coefficients as the calculation coefficients aqt3, apt3, aqt4 and apt4.

Next, the effective-region selection data is described in detail. It is assumed that six sets of calculation coefficients aqn and apn (n=1 to 6) are present for six effective-region selection data for ahn (n=1 to 6). The effective-region selection data ahn (n=1 to 3) designate coefficients output as aqt3 and apt3, and ahn (n=4 to 6) designate the calculation coefficients output as aqt4 and apt4. The selection pattern of the calculation coefficients aqt3 and apt3 selected based on the effective-region selection data ahn (n=1 to 3), and the identification code S, and the corresponding polynomial data T3 are shown in Table 4-1, while the selection pattern of the calculation coefficients aqt4 and apt4, and the corresponding polynomial data T4 are shown in Table 4-2.

TABLE 4-1

| ID CODE S | aqt3 | apt3 | T3 |
|---|---|---|---|
| S = ah1 | aq1 | ap1 | h21 |
| S = ah2 | aq2 | ap2 | h22 |
| S = ah3 | aq3 | ap3 | h23 |
| S ≠ ah1, S ≠ ah2, S ≠ ah3 | 0 | 0 | 0 |

TABLE 4-2

| ID CODE S | aqt4 | apt4 | T4 |
|---|---|---|---|
| S = ah4 | aq4 | ap4 | h24 |
| S = ah5 | aq5 | ap5 | h25 |
| S = ah6 | aq6 | ap6 | h26 |
| S ≠ ah4, S ≠ ah5, S ≠ ah6 | 0 | 0 | 0 |

In Table 4-1 and Table 4-2, h21, h22, h23, h24, h25 and h26 are represented by the following formula (4).

$$\left.\begin{aligned} h21 &= \min(ap3 \times T1, aq3 \times T2) \\ h22 &= \min(ap3 \times T1, aq3 \times T2) \\ h23 &= \min(ap3 \times T1, aq3 \times T2) \\ h24 &= \min(ap4 \times T1, aq4 \times T2) \\ h25 &= \min(ap4 \times T1, aq4 \times T2) \\ h26 &= \min(ap4 \times T1, aq4 \times T2) \end{aligned}\right\} \quad (4)$$

The values of the coefficients apn and apn (n=1 to 6) and the effective-region selection data ahn (n=1 to 6) are set according to the manner of the color conversion.

In the selection pattern shown in Table 4, when the effective-region selection data are such that ah1=1, ah2=2, ah3=3, ah4=4, ah5=5 and ah6=6, the polynomial data T3

Figure 12:
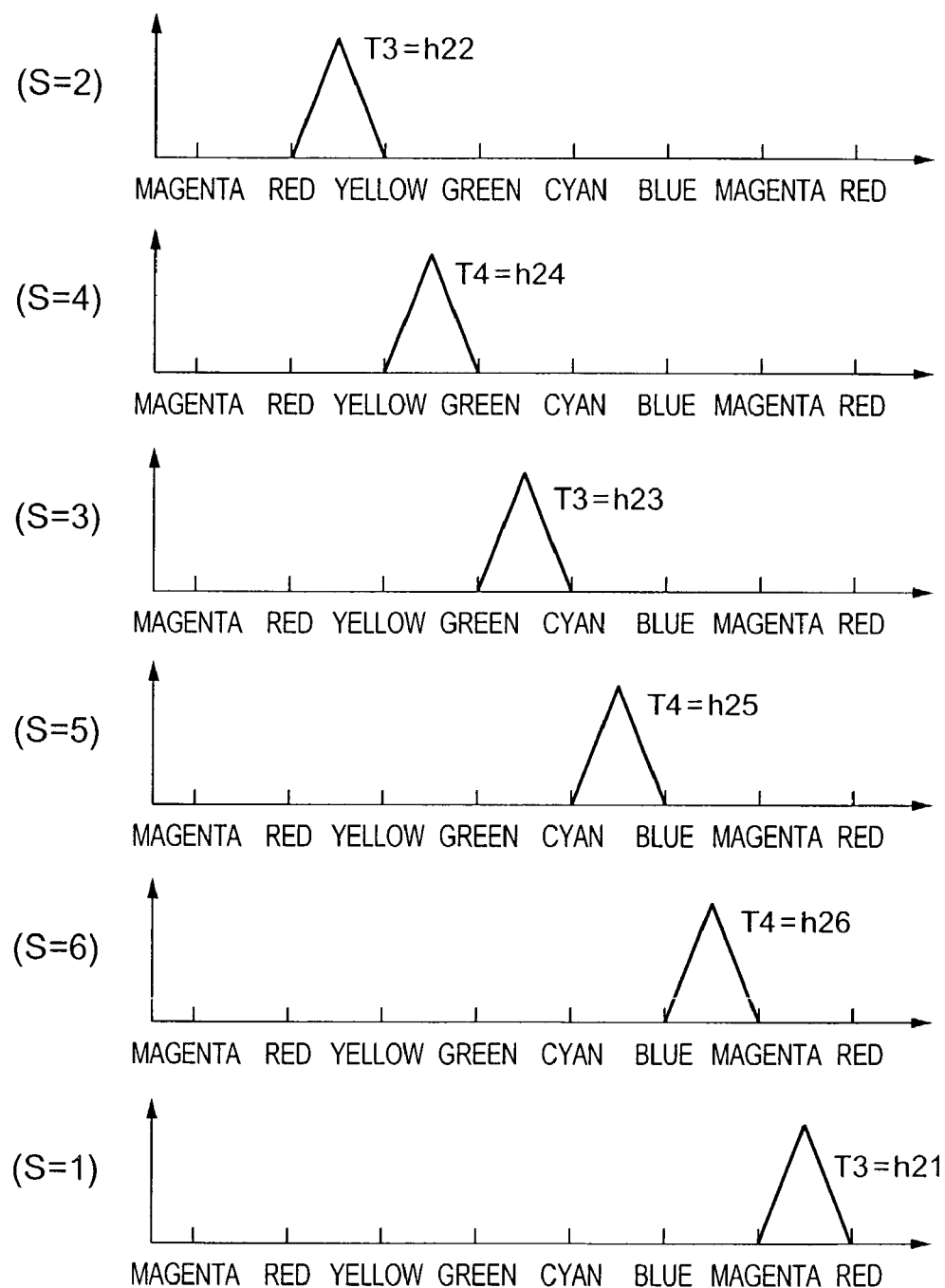
FIG. 12 shows an example of the relationship between polynomial data T3 and T4, and an identification codes S.

(h21, h22, h23) is effective for the inter-hue region in the inter-hue zone magenta-red, red-yellow, green-cyan corresponding to S=1, 2, 3, and the polynomial data T4 (h24, h25, h26) is effective for the inter-hue region in the inter-hue zone yellow-green, cyan-blue, blue-magenta corresponding to S=4, 5, 6. The polynomial data which is effective for each inter-hue region corresponding to the identification code S (=1 to 6) when the calculation coefficients are such that aqn=apn (n=1 to 6) are shown in the following Table 5, and are schematically illustrated in FIG. 12.

TABLE 5

| INTER-HUE ZONE | ID CODE S | POLYNOMIAL DATA T3, T4 |
|---|---|---|
| MAGENTA-RED | 1 | T3 = h21 |
| RED-YELLOW | 2 | T3 = h22 |
| GREEN-CYAN | 3 | T3 = h23 |
| YELLOW-GREEN | 4 | T4 = h24 |
| CYAN-BLUE | 5 | T5 = h25 |
| BLUE-MAGENTA | 6 | T6 = h26 |

(FOR THE CASE WHERE ah1 = 1, ah2 = 2, ah3 = 3, ah4 = 4, ah5 = 5, ah6 = 6)

Figure 13:
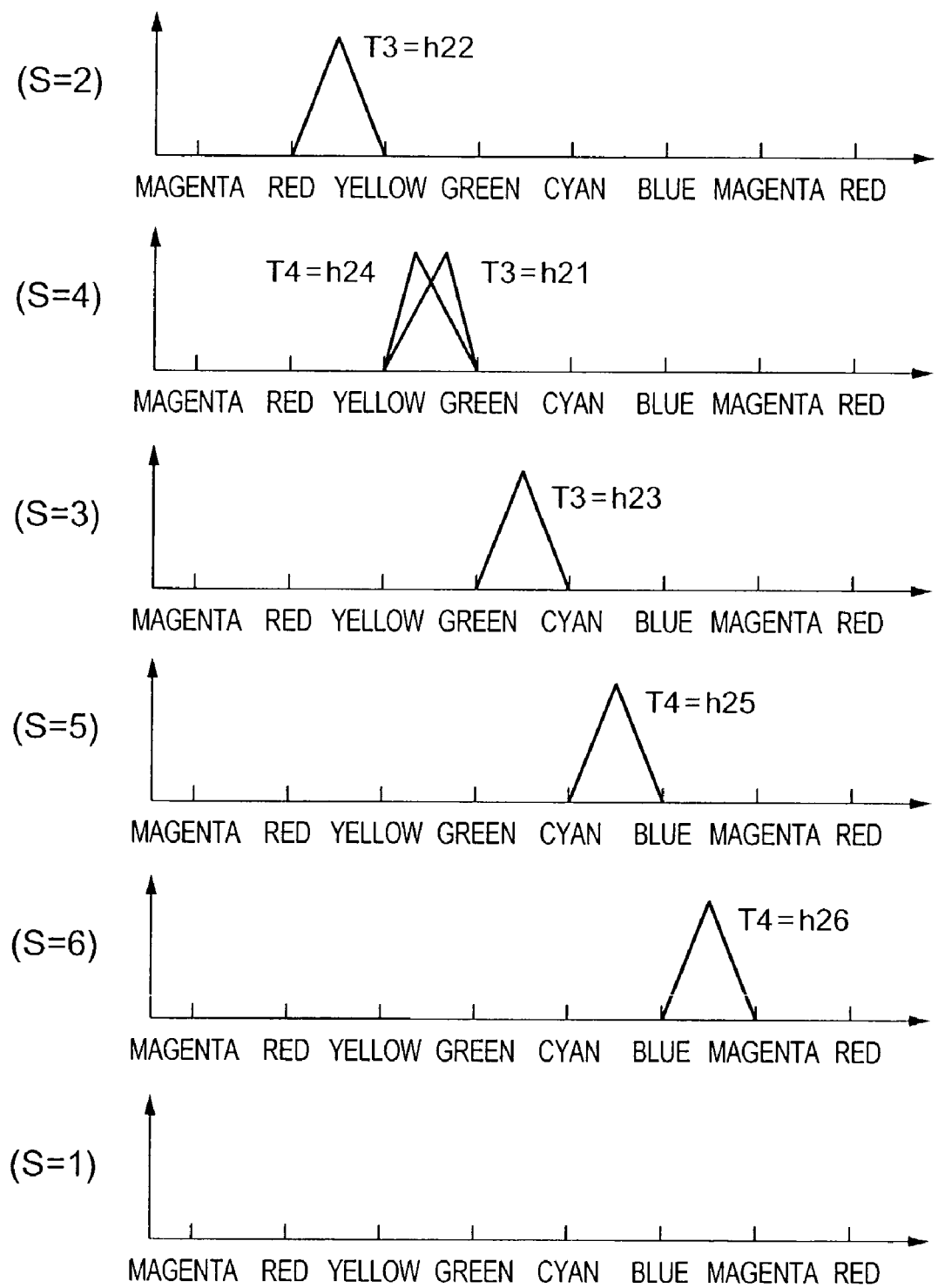
FIG. 13 shows an example of the relationship between polynomial data T3 and T4, and an identification code S.

In the selection pattern shown in Table 4, when the effective-region selection data are such that ah1=4, ah2=2, ah3=3, ah4=4, ah5=5, ah6=6, the polynomial data T3 (h21, h22, h23) is effective for the inter-hue region in the inter-hue zone yellow-green, red-yellow, green-cyan corresponding to S=4, 2, 3, and the polynomial data T4 (h24, h25, h26) is effective for the inter-hue region in the inter-hue zone yellow-green, cyan-blue, blue-magenta corresponding to S=4, 5, 6. That is, two polynomial data T3=h21 and T4=h24 are assigned to the inter-hue zone yellow-green (In this case, the polynomial data T3 and T4 are not generated for the inter-hue zone magenta-red). The effective polynomial data corresponding to the identification code S when the calculation coefficients are such that aq1:ap1=1:2, ap4:ap4=2:1, aqn=apn (n=2, 3, 5, 6) are shown in the following Table 6, and are schematically illustrated in FIG. 13.

TABLE 6

| INTER-HUE ZONE | ID CODE S | POLYNOMIAL DATA T3, T4 |
|---|---|---|
| MAGENTA-RED | 1 | 0 |
| RED-YELLOW | 2 | T3 = h22 |
| GREEN-CYAN | 3 | T3 = h23 |
| YELLOW-GREEN | 4 | T3 = h21, T4 = h24 |
| CYAN-BLUE | 5 | T4 = h25 |
| BLUE-MAGENTA | 6 | T4 = h26 |

(FOR THE CASE WHERE ah1 = 4, ah2 = 2, ah3 = 3, ah4 = 4, ah5 = 5, ah6 = 6)

As shown in FIG. 12 and FIG. 13, by adjusting set values of the effective-region selection data ahn, and corresponding calculation coefficients aqn, apn, it is possible to select, from among the inter-hue zones red-yellow, yellow-green, green-cyan, cyan-magenta, magenta-red, the inter-hue zone and the inter-hue region for which the polynomial data T3 and T4 are effective.

4. Matrix Calculator

As shown in FIG. 4, the hue data r, g, b, and the polynomial data T1 to T4 are input to the matrix calculator 4. The coefficient generator 5 generates coefficients U consisting of matrix coefficients Fij for the polynomial data T1 to T4, and the fixed matrix coefficients Eij for the hue data r, g, b based on the identification code S, and the effective-region selection data ahn. For the fixed matrix coefficients Eij, i=1 to 3, j=1 to 3. For the matrix coefficients Fij, i=1 to 3, j=1 to 4. The matrix calculator 4 performs matrix calculation using the hue data r, g, b, the polynomial data T1 to T4, and the matrix coefficients Eij and Fij, and outputs the result of calculation of the following formula (5) as the converted color data R1, G1 and B1.

$$\begin{bmatrix} R1 \\ G1 \\ B1 \end{bmatrix} = (Eij) \begin{bmatrix} r \\ g \\ b \end{bmatrix} + (Fij) \begin{bmatrix} T1 \\ T2 \\ T3 \\ T4 \end{bmatrix} \quad (5)$$

Figure 14:
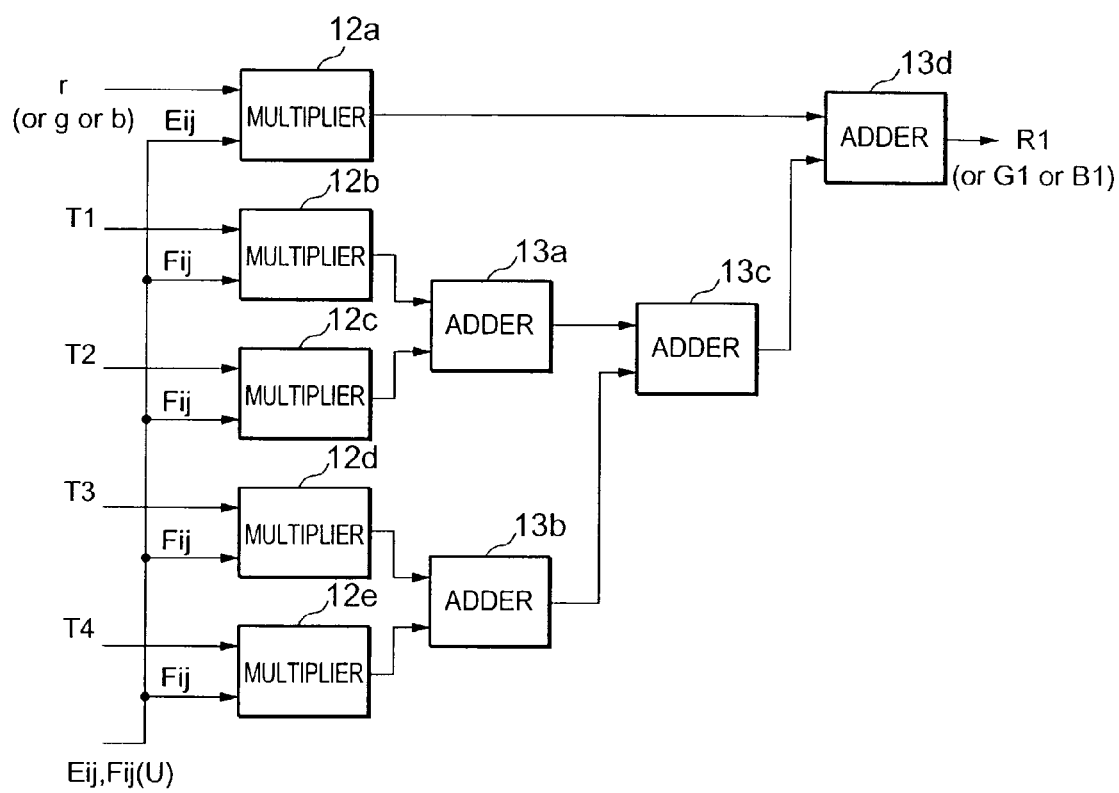
FIG. 14 shows the internal configuration of a matrix calculator.

FIG. 14 is a block diagram showing an example of configuration of the matrix calculator 4 shown in FIG. 4. Multipliers 12a to 12e output the products of the hue data r, and the polynomial data T1 to T4, and the fixed matrix coefficients Eij, and the matrix coefficients Fij. Adders 13a and 13b add the products from the multipliers 12b and 12c and the multipliers 12d and 12e. The outputs of the adders 13a and 13b are added at an adder 13c. An adder 13d outputs the sum of the output of the adder 13c, and the output of the multiplier 12a, as the converted color data R1. In the example of configuration of the matrix calculator 4 shown in FIG. 14, if in place of the hue data r, the hue data g, b is input to the multiplier 12, the converted color data G1 or B1 is calculated.

Incidentally, in the coefficient generator 5 shown in FIG. 4, values of the coefficients corresponding to the hue data r, g, b are used as the matrix coefficients Fij for the comparison-result data T1 to T4, and the fixed matrix coefficients Eij, for the hu data r, g, b. That is, if three matrix calculators each configured as shown in FIG. 14 are used in parallel, the matrix calculation can be achieved at a high speed.

The synthesizer 6 adds the converted color data R1, G1 and B1, and the minimum value α representing the achromatic component, to output color data Ro, Go, Bo. The calculation to determine the color data Ro, Go, Bo is represented by the following formula (6).

$$\begin{bmatrix} Ro \\ Go \\ Bo \end{bmatrix} = (Eij) \begin{bmatrix} r \\ g \\ b \end{bmatrix} + (Fij) \begin{bmatrix} T1 \\ T2 \\ T3 \\ T4 \end{bmatrix} + \begin{bmatrix} \alpha \\ \alpha \\ \alpha \end{bmatrix} \quad (6)$$

5. Example of Color Conversion Method

An example of color conversion operation of a color conversion apparatus according to the embodiment shown in FIG. 4 is next described.

It is assumed here that the color data Ri, Gi and Bi representing colors in the inter-hue zone yellow-green are converted such that the hue green is converted to "bluish green" and the hue yellow is converted to "reddish yellow."

When the identification code S=4 identifying the yellow-green inter-hue region is output from the αβ calculator 1, the coefficient generator 5 generates corresponding fixed coefficients Eij (U), and matrix coefficients Fij (U). As the polynomial data T1 and T2, h1g effective for green, and h1y effective for yellow are output from the minimum value selectors 9a and 9b shown in FIG. 6. As the polynomial data T3 and T4, two calculation terms h24 and h21 effective for yellow-green are output from the minimum value selectors 9c and 9d.

Figure 15:
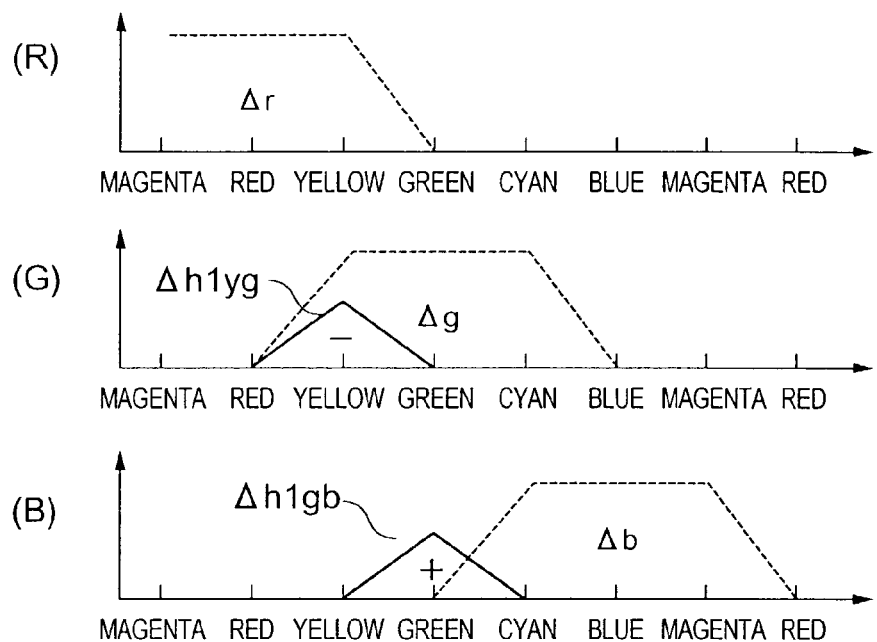
FIG. 15 shows the function of polynomial data T1 and T2 in the color conversion.
Figure 16:
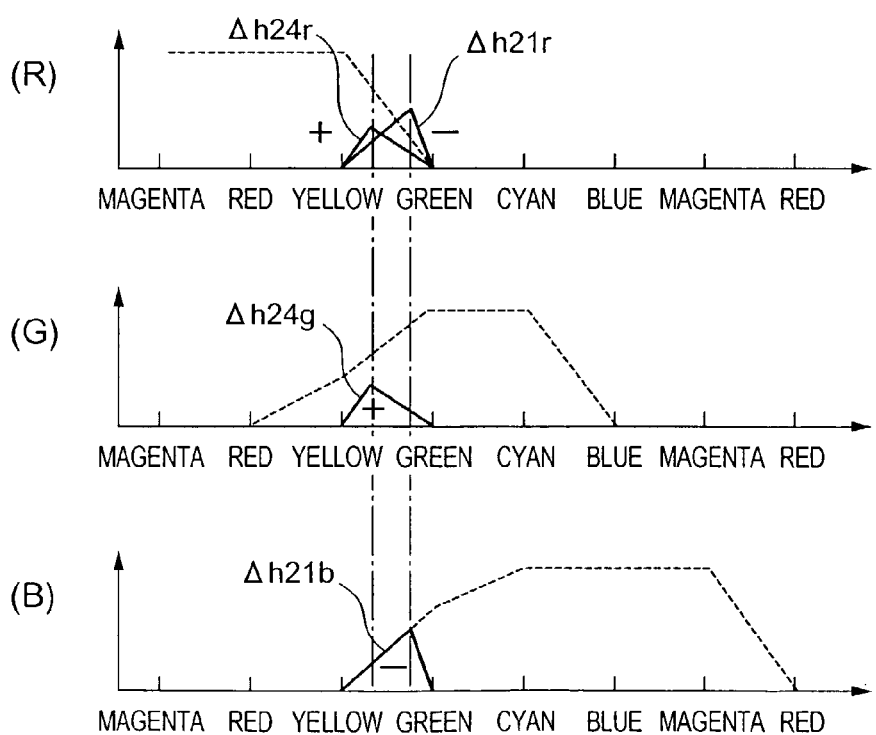
FIG. 16 shows the function of polynomial data T3 and T4 in the color conversion.
Figure 17:
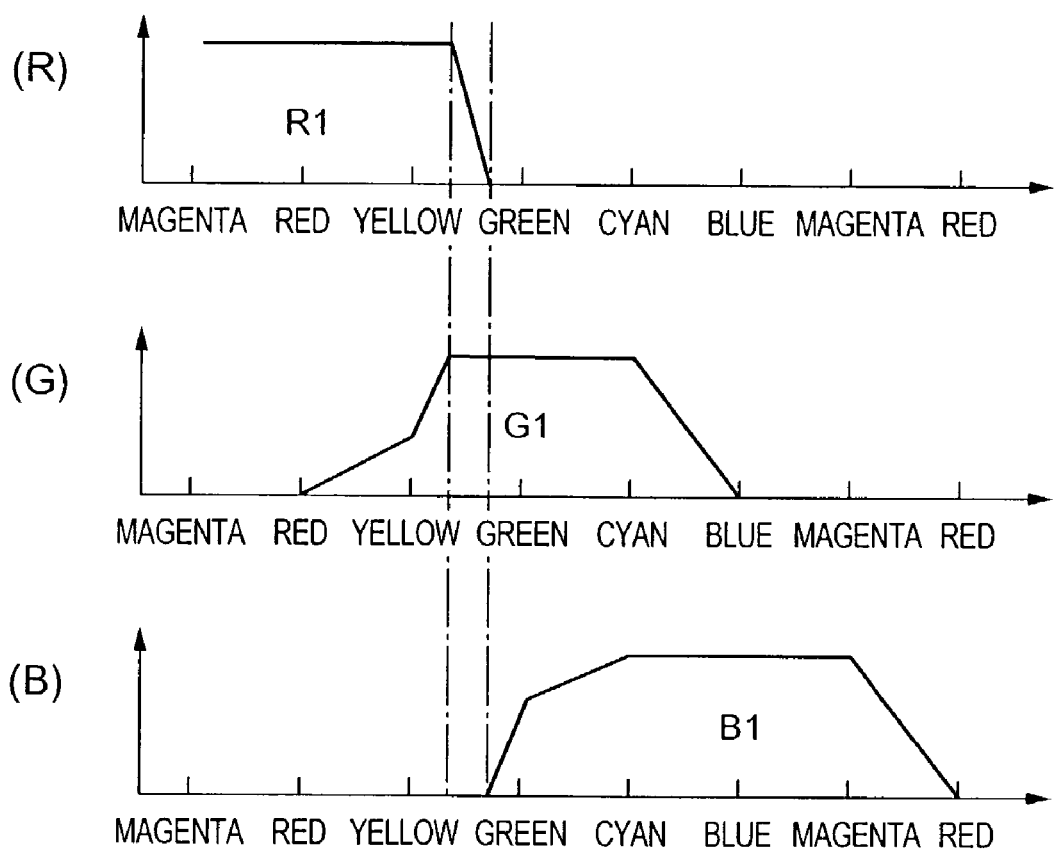
FIG. 17 shows an example of color conversion characteristics of a color conversion apparatus according to Embodiment 1.

FIG. 15 schematically illustrates calculation terms Δh1gb and Δh1yg obtained by multiplying the polynomial data h1g and h1y by predetermined matrix coefficients Fij. FIG. 16 schematically illustrates calculation terms Δh24r, Δh21r, Δh24g and Δh21b obtained by multiplying the polynomial data h24 and h21 by predetermined matrix coefficients Fij. By adding each of the calculation terms shown in FIG. 15, to the calculation term Δr, Δg, Δb (the calculation terms obtained by multiplying the hue data r, g, b by the fixed matrix coefficients E (ij)) corresponding to the respective hues red, green and blue, the conversion characteristics shown by broken lines in FIG. 16 can be obtained. As shown in FIG. 16, by means of the calculation term Δh1yg and Δh1gb, the blue component is increased in the hue green, so that the hue green is rendered "bluish green," and green component is reduced in the hue yellow, so that the hue yellow is rendered "reddish yellow." However, as shown in FIG. 16, in the inter-hue zone yellow-green, by means of the calculation term Δh1gb, blue component is increased so that an achromatic component is generated, and by means of the calculation term Δh1yg, green component is reduced so that the luminance is lowered. For this reason, compensation is made by means of the calculation terms Δh24r, Δh21r, Δh24g and Δh21b shown in FIG. 16. As shown in FIG. 16 and FIG. 17, the calculation terms Δh24r and Δh21r compensate for the reduction in the luminance in the neighborhood of the hue yellow, and restrain the generation of the achromatic component by means of the red component. The calculation term Δh24g increases the green component, Δh21b restrains the generation of the achromatic component due to the blue component. As a result, as shown in FIG. 17, the polynomial data T3 and T4 compensate for the reduction in the luminance, and the generation of the achromatic component associated with the color conversion.

Figure 18:
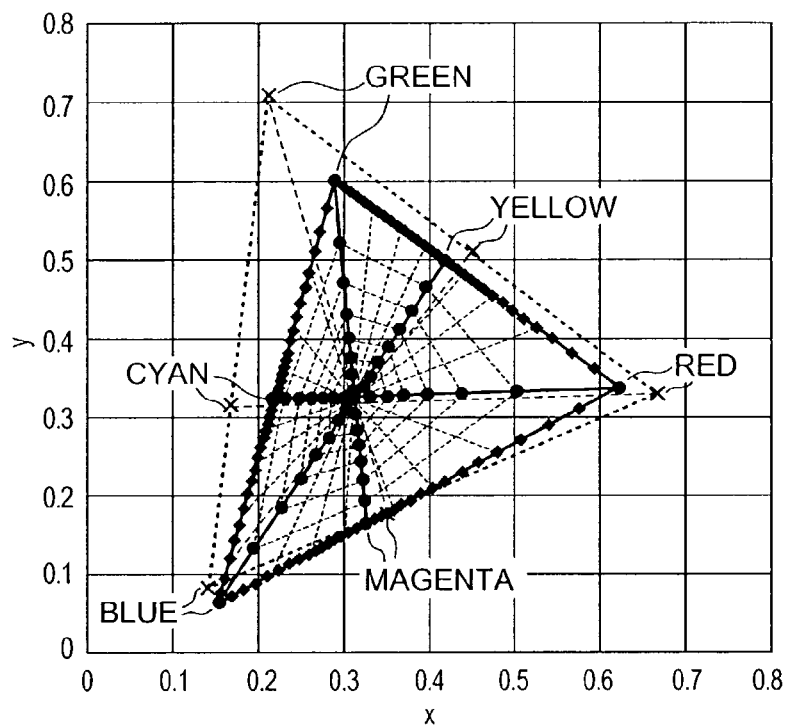
FIG. 18 is an xy chromaticity diagram showing a color reproducibility of a typical display device.

The effect of the color conversion by the color conversion an xy chromaticity diagram. FIG. 18 is an xy chromaticity diagram showing the color reproducibility of an image display apparatus displaying color images, in the case where color conversion is not effected. In the chromaticity diagram shown in FIG. 18, the solid line represents the color reproducibility of the image display apparatus, while the dotted line represent the target reproducibility. In FIG. 18, the directions in which the straight lines extend from a point at about the center of the triangle representing the color reproducibility toward the vertixes and the sides represent the hues of red, green, blue, yellow, magenta and cyan, and the distance from the center represent the saturation. As shown in FIG. 18, when no color conversion is conducted, the target color reproducibility and the actual color reproducibility do not coincide. For instance, the solid line representing the reproducibility of the hue green is deviated in the clockwise direction from the dotted line. In this case, the hue green as displayed on the image display apparatus is rendered "yellowish green." Moreover, the line representing the reproducibility of the hue yellow is deviated in the counterclockwise direction from the dotted line. In this case, the hue green as displayed on the image display apparatus is rendered "greenish yellow."

Figure 19:
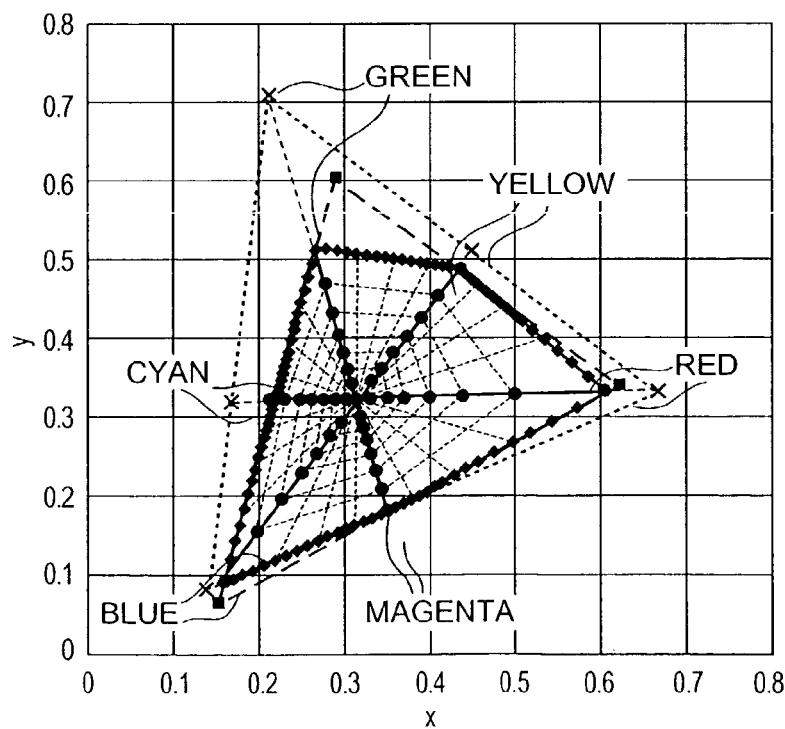
FIG. 19 is an xy chromaticity diagram showing the effect of polynomial data T1 and T2 in the color conversion.

FIG. 19 is an xy chromaticity diagram showing the color reproducibility obtained when the color conversion is conducted by a color conversion apparatus according to the present embodiment. That is, the solid line in FIG. 19 shows the color reproducibility obtained by increasing the blue component in the hue green, and reducing the green component in the hue yellow by means of the calculation terms (examples being shown in FIG. 15 as Δh1yg and Δh1gb) obtained by multiplying the polynomial data T1=h1y and T2=h1g by predetermined matrix coefficients, as shown in FIG. 15. In FIG. 19, the solid lines representing the color reproducibility of the hues green and yellow coincide with the dotted line representing the target color reproducibility, which means that the color reproducibility of the image display apparatus is compensated. However, due to the generation of the unnecessary achromatic component associated with the color conversion, the saturation in the inter-hue zone between yellow and green is lowered.

Figure 20:
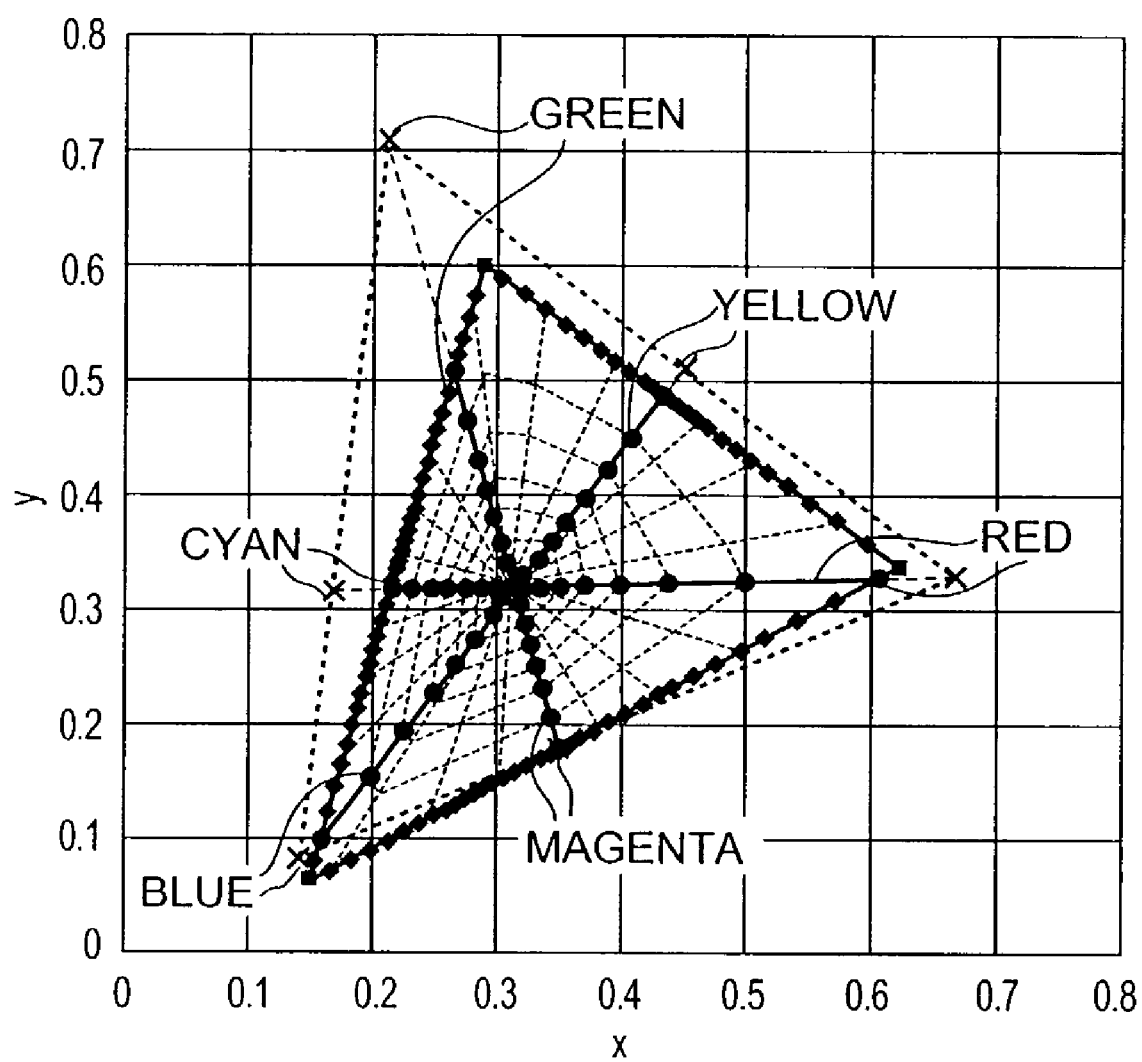
FIG. 20 is an xy chromaticity diagram showing the effect of polynomial data T3 and T4 in the color conversion.

FIG. 20 shows a chromaticity diagram for the case where reduction in the luminance and the generation of the achromatic component are compensated by the calculation terms Δh24r, Δh21r, Δh24g and Δh21b obtained by multiplying the polynomial data T3=h21 and T4=h22 by predetermined matrix coefficients, as shown in FIG. 16. It is seen from FIG. 20, that the reduction in the saturation in the inter-hue zone green-yellow shown in FIG. 19 is compensated for.

As has been described, by means of the matrix calculation using the polynomial data T1 to T4, color conversion with a high reproducibility can be conducted.

As has been described, according to the color conversion apparatus according to the present embodiment, it is possible to achieve color conversion paying a special attention to a specific hue, without suffering from generation of the achromatic component, and the reduction in the luminance. Moreover, the effective-region selection data ahn can be used to select, in the inter-hue zone red-yellow, yellow-green, green-cyan, cyan-blue, blue-magenta, or magenta-red, the inter-hue region for which the polynomial data T3 and T4 are effective. Accordingly, the polynomial data need not be increased but may be generated as required. Moreover, the effective-region selection data ahn can be used to generate the polynomial data T3 and T4, such that the polynomial data are effective in two inter-hue regions in an inter-hue zone, with the result that it is possible to adjust, in the inter-hue zone yellow-green, an inter-hue region near yellow, and an inter-hue region near green, for example, independently. At the same time, the reduction in the luminance and the generation of the achromatic component due to the color conversion can be compensated for.

In Embodiment 1, the configuration may be such that complementary color data representing complementary colors may be generated based on the color data R1, G1 and B1 obtained by the color conversion conducted by the matrix calculator 4. Moreover, in Embodiment 1, the configuration may be such that it is effective for two or more regions in the inter-hue zone red-yellow, yellow-green, green-cyan, cyan-blue, blue-magenta, or magenta-red. For instance, the polynomial calculator shown in FIG. 6 may be adapted to calculate a further polynomial data T5=min(apt5×T1, aqt5×T2) (here, aqt3:apt3≠≠aqt4:apt4≠aqt5:apt5), and the coefficient generator 5 may be adapted to output matrix coefficients for the polynomial data T1 to T5. By means of the matrix calculation using the polynomial data T1 to T5, the three regions in the inter-hue zone can be converted independently.

The color conversion apparatus according to Embodiment 1 can be implemented by means of software, and yet similar effects are obtained.

Embodiment 2

The color conversion apparatus according to the present embodiment converts the color data Ri, Gi, Bi representing red, green, blue to complementary colors cyan, magenta, yellow, and performs the color conversion on the converted complementary color data Ci, Mi, Yi.

Figure 21:
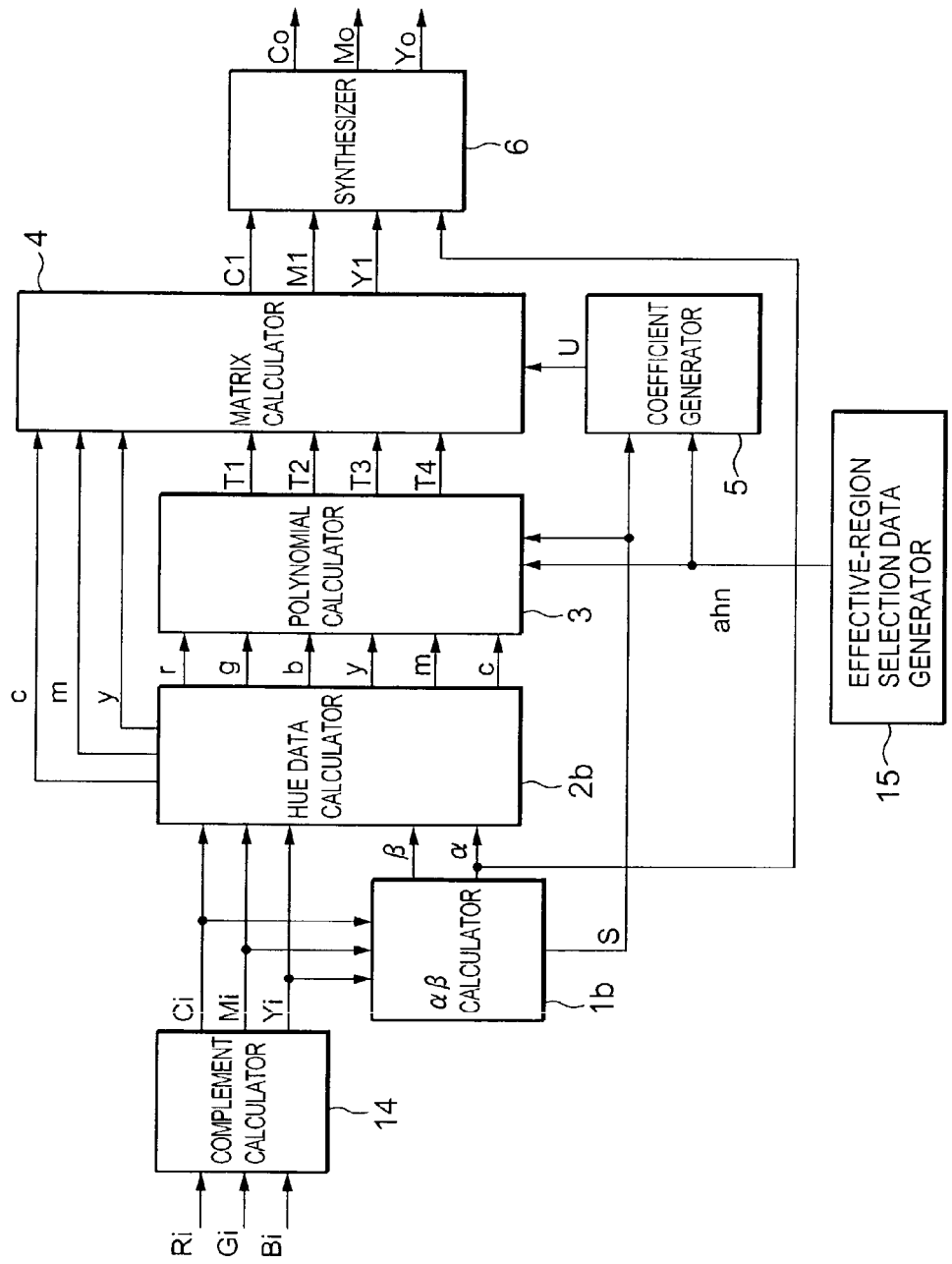
FIG. 21 shows the configuration of a color conversion apparatus according to Embodiment 2.

FIG. 21 is a block diagram showing the configuration of the color conversion apparatus according to the present embodiment. In FIG. 21, reference numerals 3 to 6, and 15 are identical to those in the color conversion apparatus of Embodiment 1 shown in FIG. 4.

A complement-determining circuit 14 determines 1's complements of the color data Ri, Gi, Bi to generate complementary color data Ci, Mi, Yi. The αβ calculator 1b outputs the maximum value β and the minimum value α of the complementary color data Ci, Mi, Yi, and also outputs an identification code S identifying the inter-hue region to which the color represented by the color data Ri, Gi, Bi belongs. Here, β=max(Yi, Mi, Ci), α=min(Yi, Mi, Ci).

The hue data calculator 2b calculates the hue data r, g, b, y, m, c, based on the complementary color data Yi, Mi, Ci, and the minimum value α and maximum value β output from the αβ calculator 1b, in the same way as in Embodiment 1. The hue data are calculated according to:

$r=\beta-Ci$,
$g=\beta-Mi$,
$b=\beta-Yi$,
$y=Yi-\alpha$,
$m=Mi-\alpha$,
$c=Ci-\alpha$.

The hue data r, g, b, y, m, c are input to the polynomial calculator 3. The hue data c, m, y are also input to the matrix calculator 4. The polynomial calculator 3 performs an operation similar to that described in connection with Embodiment 1, to calculate polynomial data T1 to T4, and outputs them to the matrix calculator 4.

The matrix calculator 4 performs matrix calculation as represented by the following formula (7), based on the hue data c, m, y, the polynomial data T1 to T4, and the matrix coefficients Fij (U) and fixed matrix coefficients Eij (U) output from the coefficient generator 5, to output converted complementary color data C1, M1, Y1.

$$\begin{bmatrix} C1 \\ M1 \\ Y1 \end{bmatrix} = (Eij)\begin{bmatrix} c \\ m \\ y \end{bmatrix} + (Fij)\begin{bmatrix} T1 \\ T2 \\ T3 \\ T4 \end{bmatrix} \quad (7)$$

In the formula (7), for Eij, i=1 to 3, j=1 to 3, and for Fij, i=1 to 3, j=1 to 4.

The matrix calculator 4 can be configured in the same way as Embodiment 1 shown in FIG. 14.

The synthesizer 6 adds the complementary color data C1, M1, Y1 from the matrix calculator 4, to the minimum value α representing the achromatic color data, to output complementary color data Co, Mo, Yo. The calculation performed by the synthesizer 18 to generate the complementary color data Co, Mo, Yo is represented by the following formula (8).

$$\begin{bmatrix} C1 \\ M1 \\ Y1 \end{bmatrix} = (Eij)\begin{bmatrix} c \\ m \\ y \end{bmatrix} + (Fij)\begin{bmatrix} T1 \\ T2 \\ T3 \\ T4 \end{bmatrix} + \begin{bmatrix} \alpha \\ \alpha \\ \alpha \end{bmatrix} \quad (8)$$

Embodiment 3

The color conversion apparatus according to the present embodiment is capable of adjusting the achromatic component by multiplying the minimum value α representing the achromatic component by a matrix coefficient.

Figure 1:
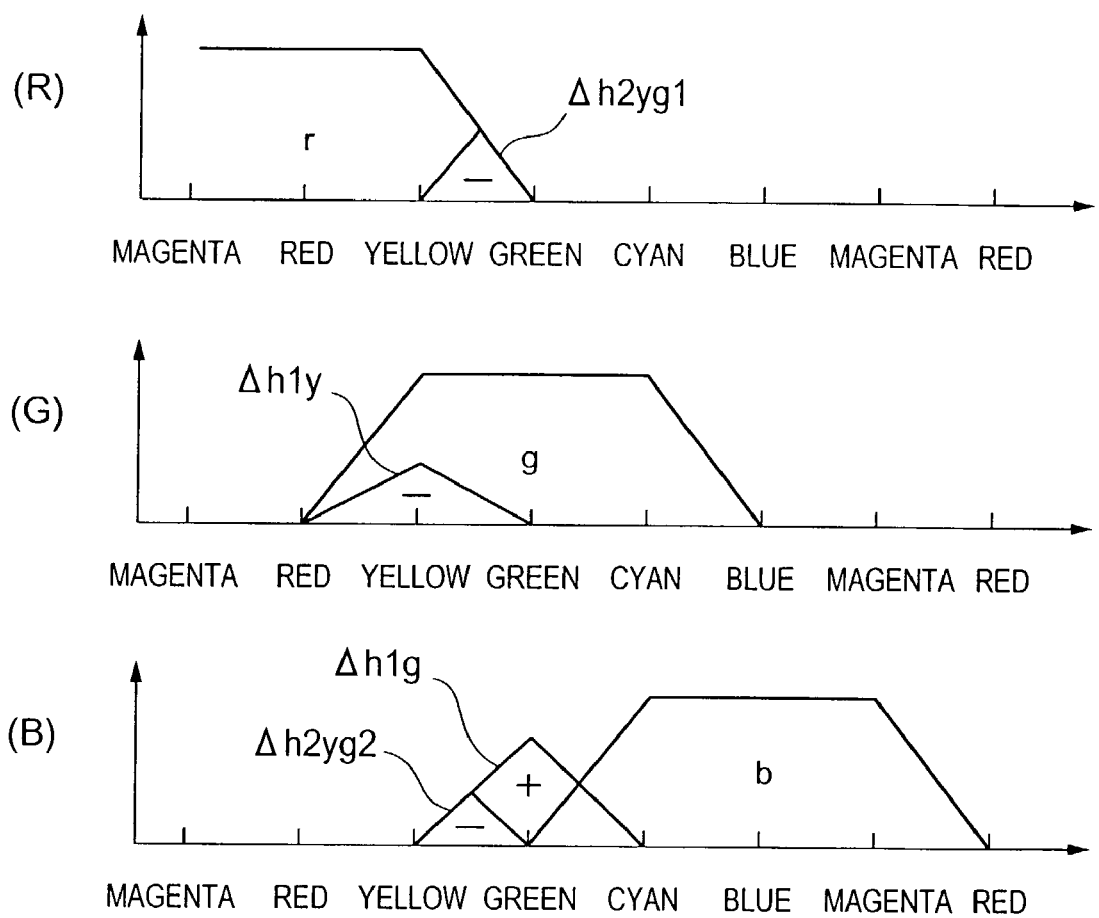
FIG. 1 is a diagram illustrating a color conversion method.
Figure 2:
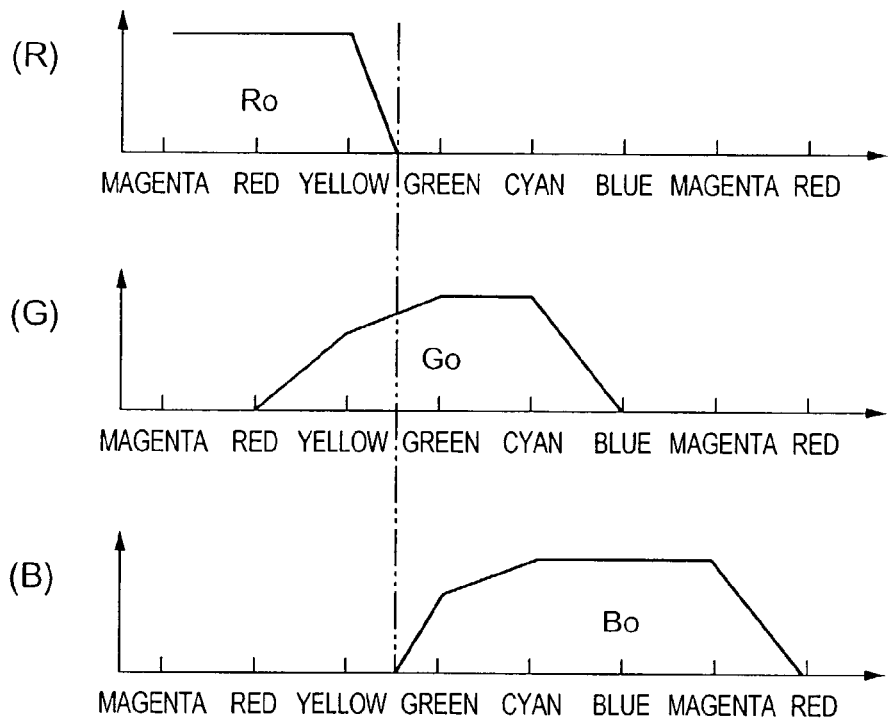
FIG. 2 shows an example of conversion characteristics of color conversion.
Figure 3:
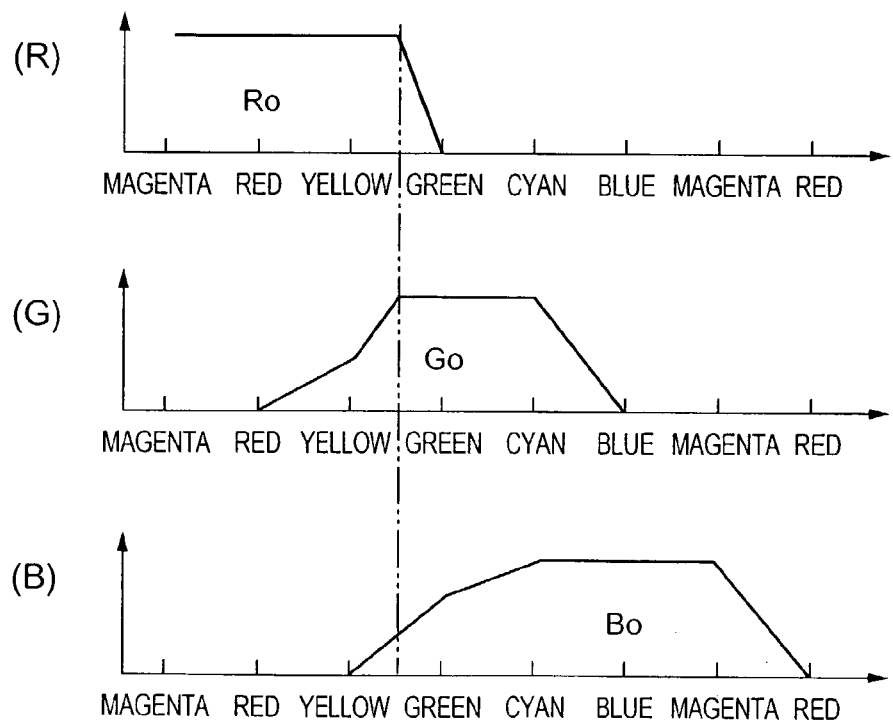
FIG. 3 shows an example of conversion characteristics of color conversion.
Figure 22:
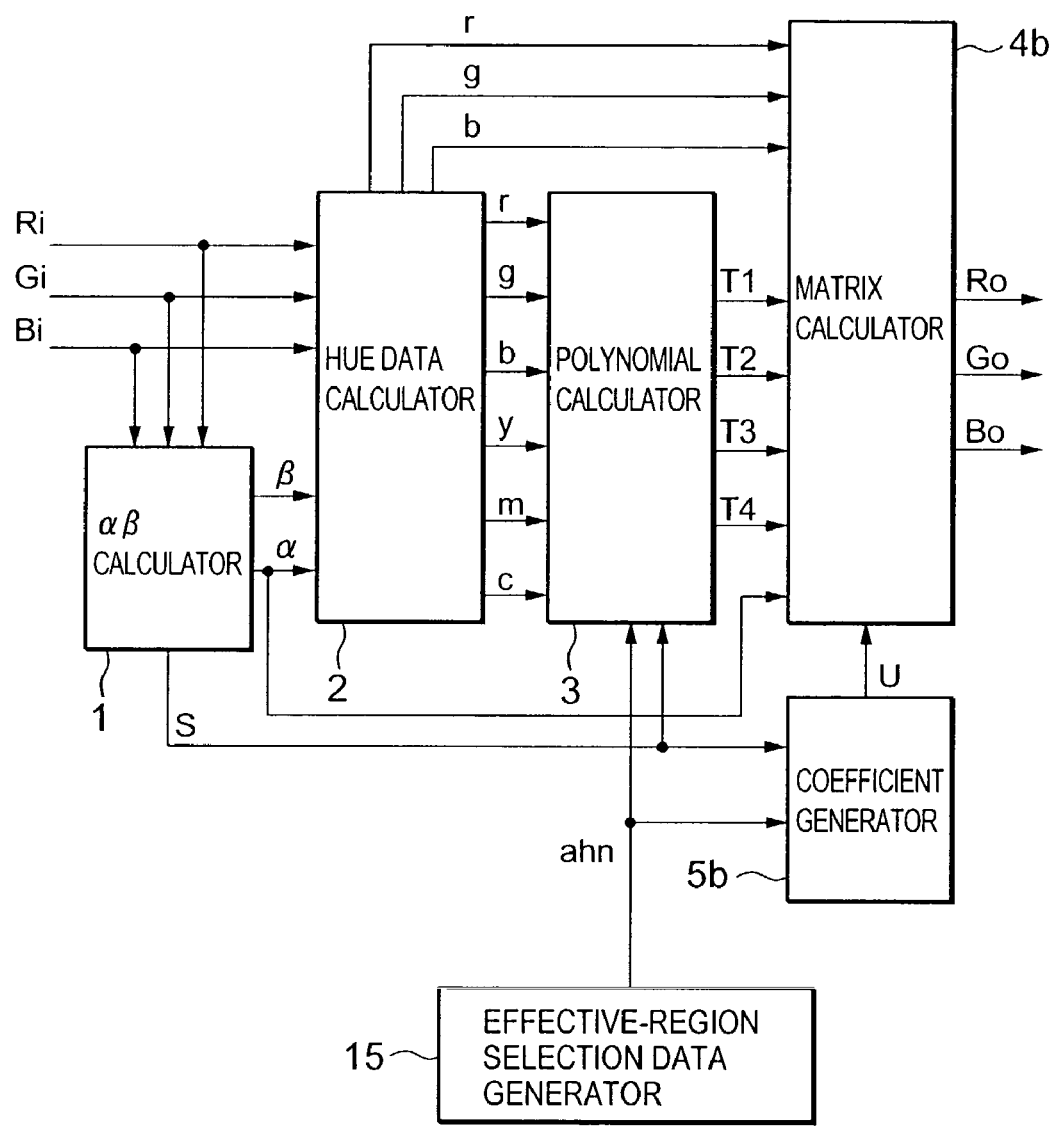
FIG. 22 shows the configuration of a color conversion apparatus according to Embodiment 3.

FIG. 22 is a block diagram showing the configuration of the color conversion apparatus according to the present embodiment. In the drawing, reference numerals 1 to 3, and 15 denote members identical to those in FIG. 1 showing Embodiment 1. The coefficient generator 5b generates matrix coefficients Gij (U) and fixed matrix coefficients Eij (U) for the polynomial data T1 to T4 and the minimum value α, based on the identification code S and effective-region selection data ahn, and supply them to the matrix calculator 4b. The matrix calculator 4b performs matrix calculation as represented by the following formula (9), based on the hue data r, g, b, the polynomial data T1 to T4, the minimum value α, and the matrix coefficients Eij and Gij(U) output from the coefficient generator 5b, to perform the color conversion.

$$\begin{bmatrix} Ro \\ Go \\ Bo \end{bmatrix} = (Eij)\begin{bmatrix} r \\ g \\ b \end{bmatrix} + (Gij)\begin{bmatrix} T1 \\ T2 \\ T3 \\ T4 \\ \alpha \end{bmatrix} \quad (9)$$

In the formula (9), for Eij, i=1 to 3, j=1 to 3, and for Gij, i=1 to 3, j=1 to 5.

In the matrix calculation formula, by adjusting the matrix coefficient Gij for the minimum value α in the above matrix calculation formula, "reddish white," "greenish white," or "bluish white" can be expressed. In contrast, if the coefficients for the minimum value α in the matrix coefficients Gij are all set to "1," color conversion of the achromatic component is not performed.

Incidentally, in the present embodiment, the configuration may be such that the color data Ro, Go, Bo obtained by the color conversion performed by the matrix calculator 4b are used to generate and output complementary color data representing the complementary colors yellow, cyan, magenta.

Figure 23:
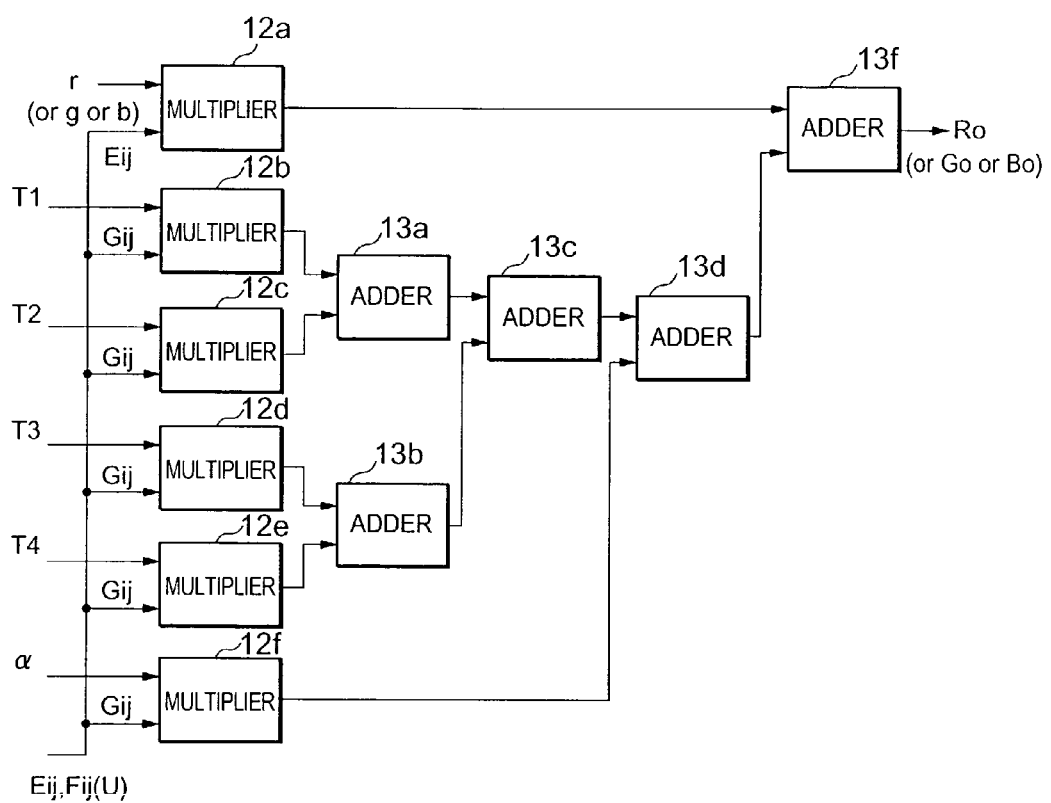
FIG. 23 shows the configuration of a color conversion apparatus according to Embodiment 4.

FIG. 23 is a block diagram showing the configuration of the matrix calculator 4b. In FIG. 23, reference numerals 12a to 12e, and 13a to 13c are similar to those in the matrix calculator 4 in Embodiment 1 shown in FIG. 14. The multiplier 12f outputs the product of the minimum value α output from the αβ calculator 1 (shown in FIG. 22) by a coefficient Gij from the coefficient generator 5b. The adder 13d outputs the sum of the output of the adder 13c, and the output of the multiplier 12f, to the adder 13f. The adder 13f outputs the sum of the output of the multiplier 12a, and the output of the adder 13d, as the color data Ro. In the configuration shown in FIG. 23, by inputting the hue data g or b, in place of the hue data r, color data Go, Bo can be calculated.

If the coefficients Eij and Gij corresponding to the respective hue data r, g, b, and three circuits of the configuration shown in FIG. 23 are used in parallel for r, g, b, a high-speed matrix calculation can be achieved.

Embodiment 4

The color conversion apparatus according to the present embodiment is similar to the color conversion apparatus according to Embodiment 2 shown in FIG. 21, but is capable of adjusting the achromatic component by multiplying the minimum value α by matrix coefficients.

Figure 24:
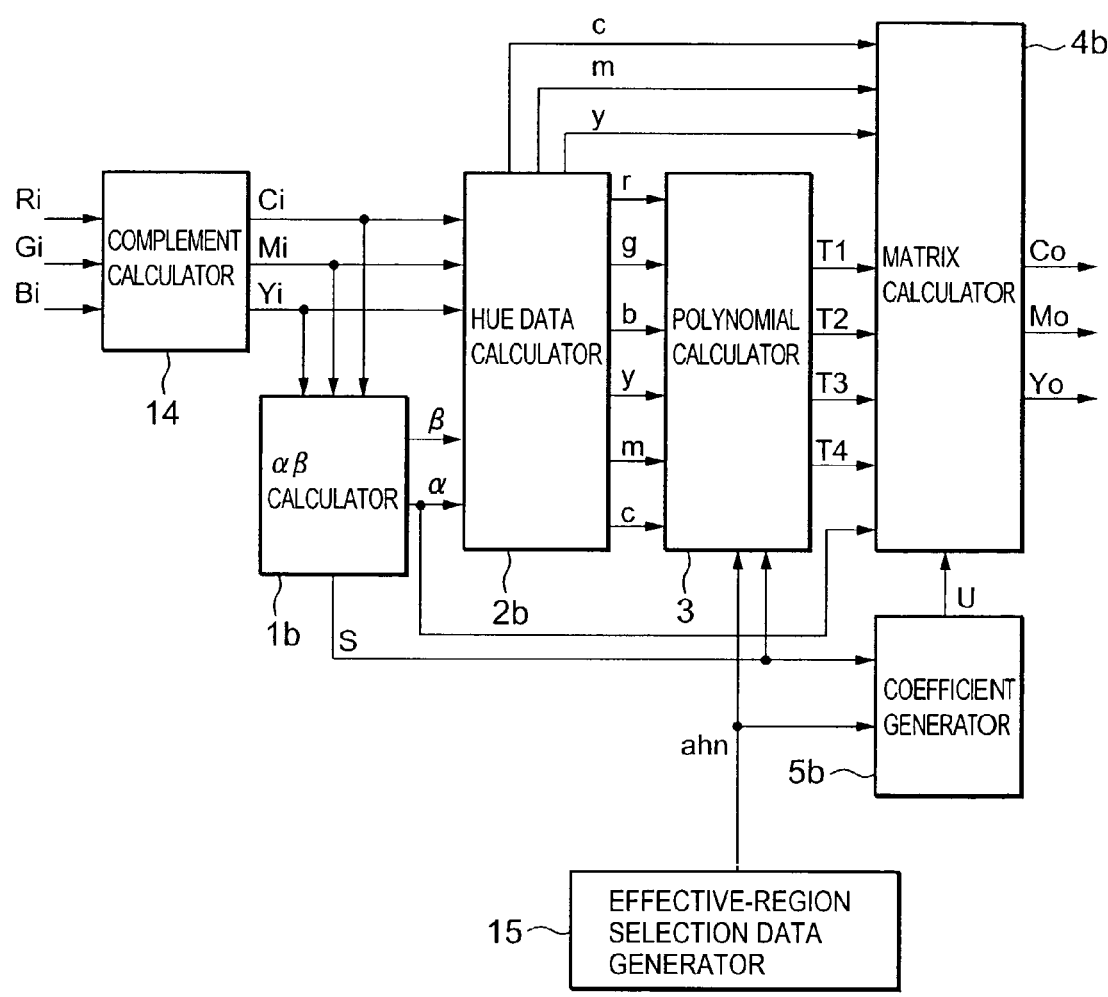
FIG. 24 shows the internal configuration of a matrix calculator.

FIG. 24 is a block diagram showing the configuration of the color conversion apparatus according to the present embodiment. In the drawing, reference numerals 1 to 3, and 15 denote members identical to those in Embodiment 2 shown in FIG. 21. A coefficient generator 5*b* generates matrix coefficients Gij (U) and fixed matrix coefficients Eij (U) for the polynomial data T1 to T4, and the minimum value α, based on the identification code S, and the effective-region selection data ahn, and supplies the generated coefficients to a matrix calculator 4*b*. The matrix calculator 4*b* performs the matrix calculation represented by the following formula (10) based on the hue data y, m, c, the polynomial data T1 to T4, the minimum value α, and the matrix coefficients Eij and Gij (U) output from a coefficient generator 5*b*, to perform the color conversion.

$$\begin{bmatrix} Yo \\ Mo \\ Co \end{bmatrix} = (Eij) \begin{bmatrix} y \\ m \\ c \end{bmatrix} + (Gij) \begin{bmatrix} T1 \\ T2 \\ T3 \\ T4 \\ \alpha \end{bmatrix} \quad (10)$$

In the formula (10), for the matrix coefficients Eij, i=1 to 3, j=1 to 3, and for Gij, i=1 to 3, j=1 to 5.

By adjusting the matrix coefficients Gij for the minimum value α, in the matrix calculation formula, "reddish black," "greenish black," or "bluish black" can be expressed. If the coefficients for the minimum value α in the matrix coefficients Gij are all set to "1," color conversion of the achromatic component is not performed.

The matrix calculator 4*b* can be configured in the same way as the one shown in FIG. 23.

Embodiment 5

The present embodiment is similar to the color conversion apparatus according to Embodiment 3 shown in FIG. 22, but color data Ri, Gi, Bi is used in place of the hue data r, g, b, as the calculation terms in the matrix calculation to perform the color conversion.

Figure 25:
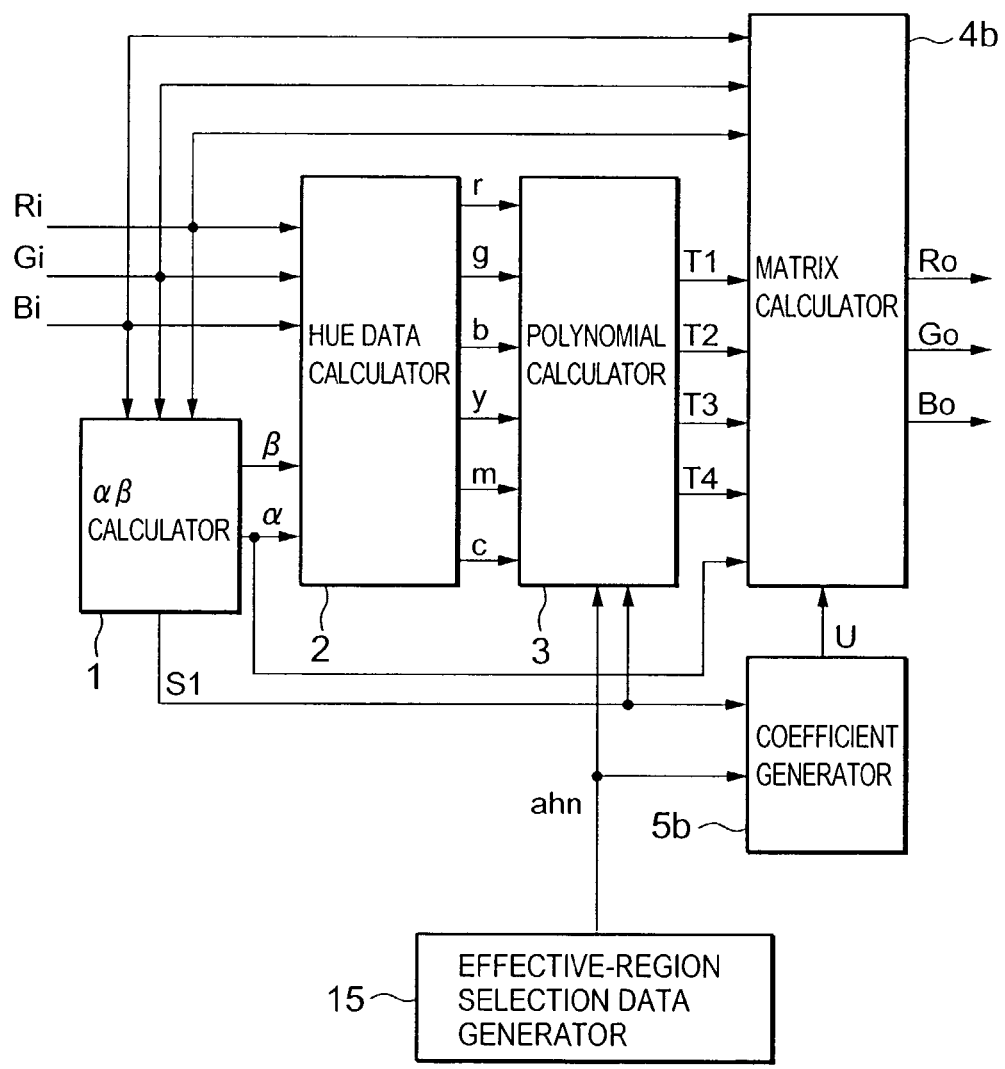
FIG. 25 shows the configuration of a color conversion apparatus according to Embodiment 5.
Figure 26:
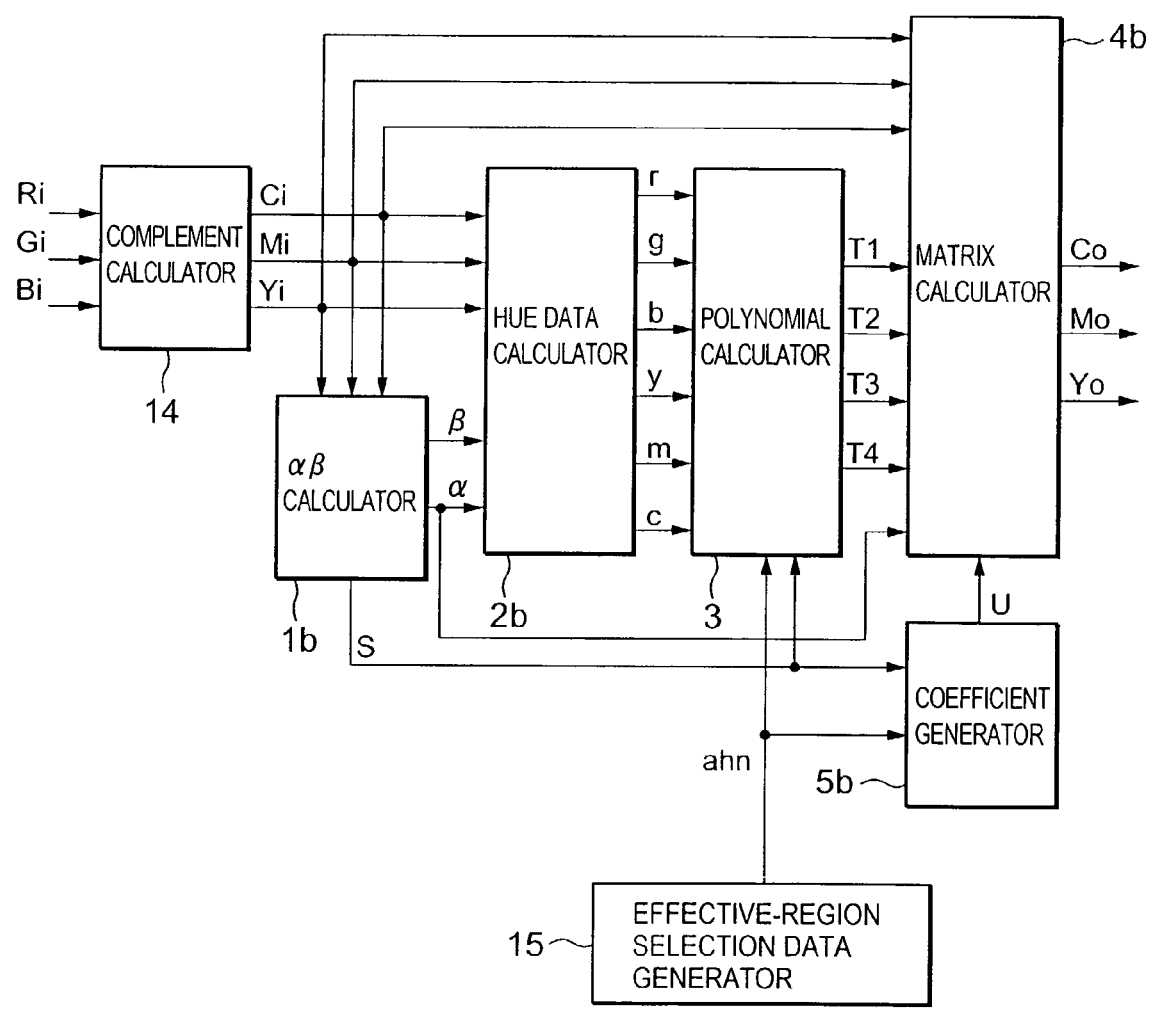
FIG. 26 shows the configuration of a color conversion apparatus according to Embodiment 6.

FIG. 25 i a drawing showing the configuration of the color conversion apparatus according to the present embodiment. The color data Ri, Gi, Bi are input to the matrix calculator 4*b*, and color conversion is performed by the matrix calculation represented by the following formula (11).

$$\begin{bmatrix} Ro \\ Go \\ Bo \end{bmatrix} = (Eij) \begin{bmatrix} Ri \\ Gi \\ Bi \end{bmatrix} + (Gij) \begin{bmatrix} T1 \\ T2 \\ T3 \\ T4 \\ \alpha \end{bmatrix} \quad (11)$$

In the formula (11), for Eij, i=1 to 3, j=1 to 3, and for Gij, i=1 to 3, j=1 to 5. By adjusting the matrix coefficients Gij, for the minimum value α in the above matrix calculation formula, "reddish white," "greenish white," or "bluish white" can be expressed. If the coefficients for the minimum value α in the matrix coefficients Gij are all set to "0," color conversion of the achromatic component is not performed.

Embodiment 6

The present embodiment is similar to the color conversion apparatus according to Embodiment 4 shown in FIG. 24, but color data Yi, Mi, Ci is input in place of the hue data y, m, c to the matrix calculator 4*b*, and used for the color conversion. The color conversion matrix calculation is represented by the following formula (12).

$$\begin{bmatrix} Yo \\ Mo \\ Co \end{bmatrix} = (Eij) \begin{bmatrix} y \\ m \\ c \end{bmatrix} + (Gij) \begin{bmatrix} T1 \\ T2 \\ T3 \\ T4 \\ \alpha \end{bmatrix} \quad (12)$$

In the formulae (12), for Eij, i=1 to 3, j=1 to 3, and for Gij, for i=1 to 3, j=1 to 5.

By adjusting the coefficients Gij for the minimum value α in the above matrix calculation, "reddish black," "greenish black," or "bluish black" can be expressed. If the coefficients for the minimum value α in the matrix coefficients Gij are all set to "0," color conversion of the achromatic component is not performed.

Embodiment 7

Because display devices employing a color cathode-ray tube (CRT) have a non-linear electrical-optical conversion characteristics, the image signal is processed by gamma correction or the like. When color conversion is performed on such image signal, desired conversion characteristics may not be obtained due to non-linear tone characteristics associated with the gamma correction. Similar problems arise with image signal obtained by highlight compression for compressing the signals for the high-luminance part of the subject by means of a digital camera.

Figure 27:
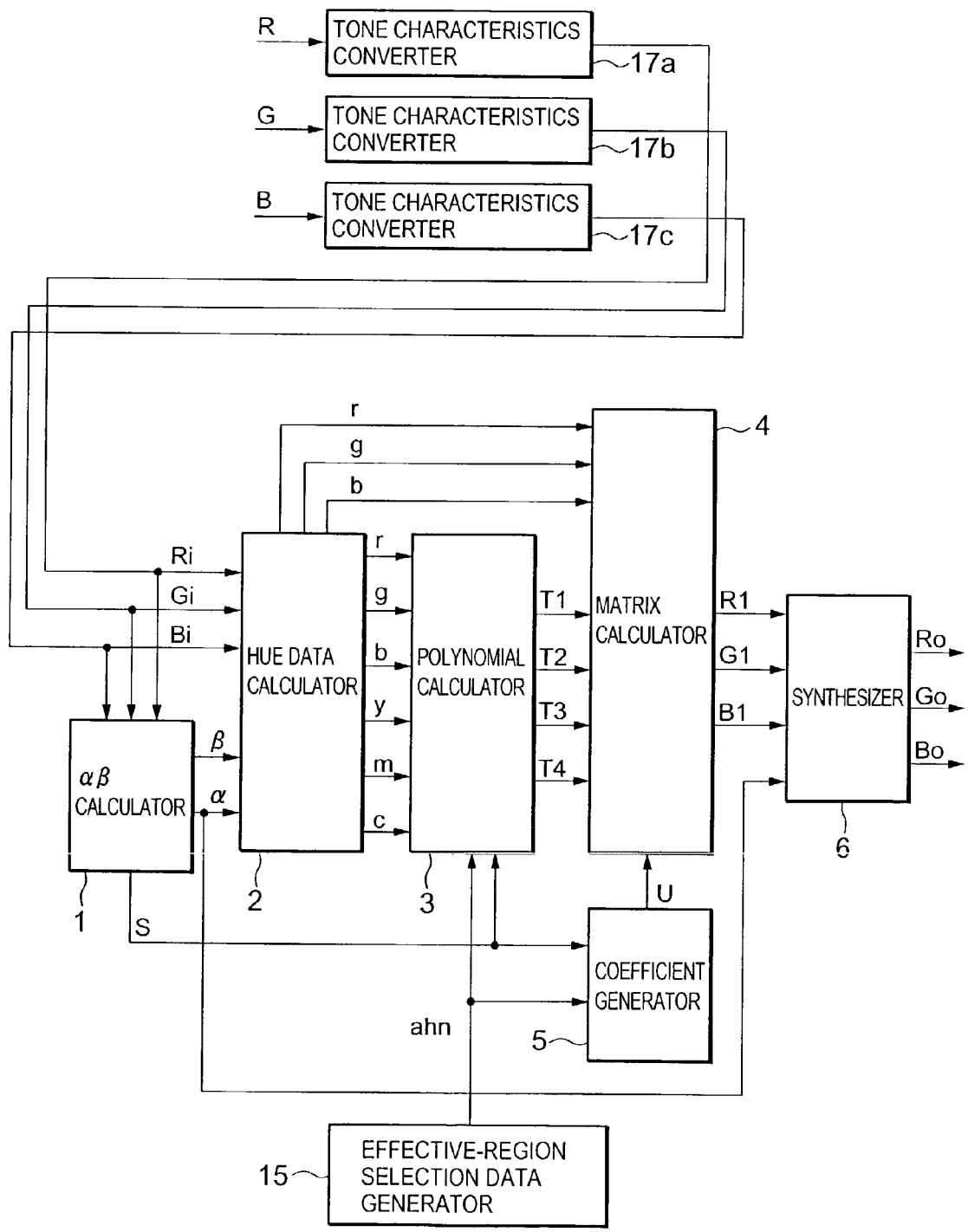
FIG. 27 shows the configuration of a color conversion apparatus according to Embodiment 7.

To solve the problem, a tone characteristics converter may be provided in the input part of the color conversion apparatus, to convert the non-linear tone characteristics, before performing the color conversion. FIG. 27 is similar to the color conversion apparatus according to Embodiment 1 shown in FIG. 4, but tone characteristics converters 17*a*, 17*b*, 17*c* are provided in the input part of the color conversion apparatus. The tone characteristics converters 17*a*, 17*b*, 17*c* convert the tone characteristics of the color data R, G, B. The color data Ri, Gi, Bi output from the tone characteristics converters 17*a*, 17*b*, 17*c* are input to the αβ calculator 1, and the hue data calculator 2, and color conversion is performed by the same operation as that described in connection with Embodiment 1.

The configuration shown in FIG. 27 may also applied to Embodiments 2 to 6. That is, tone characteristics converters 17*a*, 17*b*, 17*c* may be provided in a stage preceding the input part of the color conversion apparatus shown in FIG. 21, FIG. 22, FIG. 24, FIG. 25, or FIG. 26, to correct the tone characteristics of the color data Ri, Gi, Bi.

Embodiment 8

CRTs, and liquid-crystal display (LCD) devices have non-linear electrical-optical conversion characteristics against image signals. For instance, CRTs may have an input-out characteristics such as gamma characteristics, and LCDs may have an input-output characteristics such as S-shaped characteristics. Similarly, printers have non-linear density shaped characteristics against the image signals. Accordingly, when the color data R, G, B, or complementary color data Y, M, C obtained by the conversion by means of the color conversion apparatus according to Embodiment 1 to 7 are input to the display device, or printers for display or printing, desired color reproducibility may not be obtained.

Figure 28:
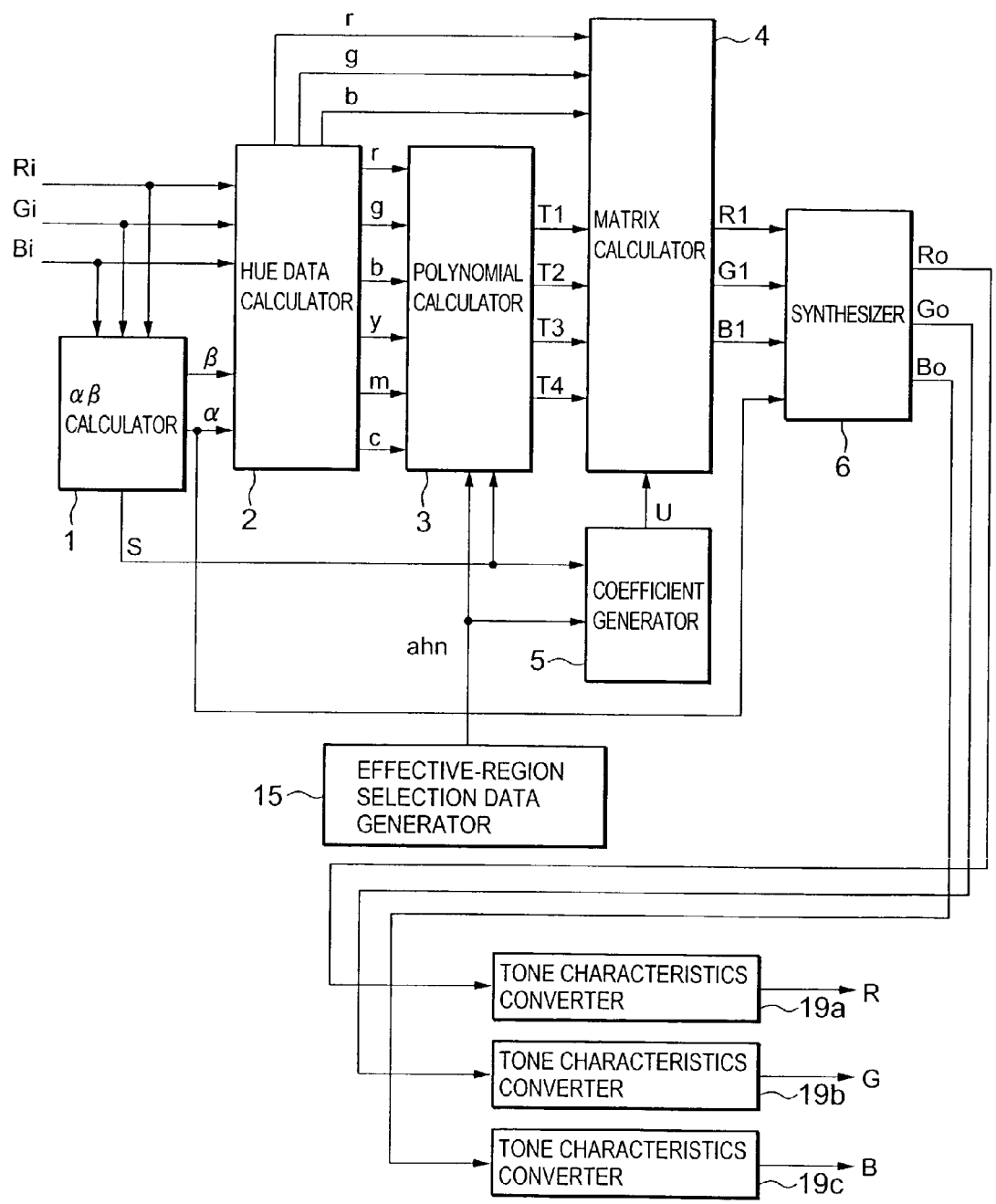
FIG. 28 shows the configuration of a color conversion apparatus according to Embodiment 8.

To solve the problem, tone characteristics converters may be provided in the output part of the color conversion apparatus to convert the tone characteristics of the output color data, or complementary color data, in accordance with the tone characteristics of the display device, or the printer. FIG. 28 is similar to the color conversion apparatus according to Embodiment 1 shown in FIG. 4, but tone characteristics converters 19a, 19b, 19c are provided in the output part. The color data Ro, Go, Bo are respectively Input to the tone characteristics converters 19a, 19b, 19c. The tone characteristics converters 19a, 19b, 19c convert the tone characteristics of the color data Ro, Go, Bo by means of inverse-gamma correction, or inverse S-shaped correction, in accordance with the display device or printer provided in the succeeding stage.

The configuration shown in FIG. 31 may also be applied to Embodiments 2 to 7. That is, the tone characteristics converters 19a, 19b, 19c may be provided in the output part of the color conversion apparatus shown in FIG. 21, FIG. 22, FIG. 24, FIG. 25, FIG. 26, or FIG. 27 (i.e., in a stage preceding the input part of the display device, or the printer).

The invention claimed is:

1. A color conversion apparatus comprising:
   means for generating a first calculation term which is effective for at least one of the hues of red, blue, green, cyan, magenta and yellow, based on color data representing colors of red, blue, and green;
   means for generating a second calculation term which is effective for a predetermined inter-hue region included in at least one of inter-hue zones of red-yellow, yellow-green, green-cyan, cyan-blue, blue-magenta and magenta-red, based on the first calculation term;
   means for generating matrix coefficients for said first calculation term, and said second calculation term;
   means for generating new color data corresponding to said color data, by means of matrix calculation using said matrix coefficients, said first calculation term, and said second calculation term; and
   means for designating the inter-hue zone and the inter-hue region for which said second calculation term is effective.

2. The color conversion apparatus according to claim 1, wherein said means for generating said first calculation term comprises:
   means for generating a maximum value and a minimum value of said color data; and
   means for generating said first calculation term based on said color data, said maximum value and said minimum value.

3. The color conversion apparatus according to claim 1, further comprising means provided in front of said means for generating said first calculation term for converting tone characteristics of the color data.

4. The color conversion apparatus according to claim 1, further comprising means provided in front of means for displaying image by means of the new color data for converting tone characteristics of the new color data.

5. A color conversion apparatus comprising:
   means for calculating complementary color data representing cyan, magenta and yellow, based on color data representing red, green and blue;
   means for generating a first calculation term which is effective for at least one of the hues of red, blue, green, cyan, magenta and yellow, based on the complementary color data;
   means for generating a second calculation term which is effective for a predetermined inter-hue region included in at least one of inter-hue zones of red-yellow, yellow-green, green-cyan, cyan-blue, blue-magenta and magenta-red, based on the first calculation term;
   means for generating matrix coefficients for said first calculation term, and said second calculation term;
   means for generating new complementary color data corresponding to said complementary color data, by means of matrix calculation using said matrix coefficients, said first calculation term, and said second calculation term; and
   means for designating the inter-hue zone and the inter-hue region for which said second calculation term is effective.

6. The color conversion apparatus according to claim 5, wherein said means for generating said first calculation term comprises:
   means for generating a maximum value and a minimum value of said complementary color data; and
   means for generating said first calculation term based on said complementary color data, said maximum value and said minimum value.

7. The color conversion apparatus according to claim 5, further comprising means provided in front of said means for calculating the color data for converting tone characteristics of the complementary color data.

8. The color conversion apparatus according to claim 5, further comprising means provided in front of means for outputting image by means of the new complementary color data for converting tone characteristics of the new complementary color data.

9. A color conversion apparatus comprising:
   means for generating a first calculation term which is effective for at least one of the hues of red, blue, green, cyan, magenta and yellow, based on color data representing colors of red, blue, and green;
   means for generating a second calculation term which is effective for a predetermined inter-hue region included in at least one of inter-hue zones of red-yellow, yellow-green, green-cyan, cyan-blue, blue-magenta and magenta-red, based on the first calculation term;
   means for calculating achromatic data representing an achromatic component of said color data;
   means for generating matrix coefficient for said first calculation term, said second calculation term, and said achromatic data;
   means for generating new color data corresponding to said color data, by means of matrix calculation using said matrix coefficients, said first calculation term, said second calculation term, and said achromatic data; and
   means for designating the inter-hue zone and the inter-hue region for which said second calculation term is effective.

10. The color conversion apparatus according to claim 9, wherein said means for generating said first calculation term comprises:
    means for generating a maximum value and a minimum value of said color data; and
    means for generating said first calculation term based on said color data, said maximum value and said minimum value.

11. The color conversion apparatus according to claim 9, further comprising means provided in front of said means for generating said first calculation term for converting tone characteristics of the color data.

12. The color conversion apparatus according to claim 9, further comprising means provided in front of means for displaying image by means of the new color data for converting tone characteristics of the new color data.

13. A color conversion apparatus comprising:
means for calculating complementary color data representing cyan, magenta and yellow, based on color data representing red, blue and green;
means for generating a first calculation term which is effective for at least one of the hues of red, blue, green, cyan, magenta and yellow, based on the complementary color data;
means for generating a second calculation term which is effective for a predetermined inter-hue region included in at least one of inter-hue zones of red-yellow, yellow-green, green-cyan, cyan-blue, blue-magenta and magenta-red, based on the first calculation term;
means for calculating achromatic data representing an achromatic component of said color data;
means for generating matrix coefficients for said first calculation term, said second calculation term, and said achromatic data;
means for generating new complementary color data corresponding to said complementary color data, by means of matrix calculation using said matrix coefficients, said first calculation term, said second calculation term, and said achromatic data; and
means for designating the inter-hue zone and the inter-hue region for which said second calculation term is effective.

14. The color conversion apparatus according to claim 13, wherein said means for generating said first calculation term comprises:
means for generating a maximum value and a minimum value of said complementary color data; and
means for generating said first calculation term based on said complementary color data, said maximum value and said minimum value.

15. The color conversion apparatus according to claim 13, further comprising means provided in front of said means for calculating the complementary color data for converting tone characteristics of the complementary color data.

16. The color conversion apparatus according to claim 13, further comprising means provided in front of means for outputting image by means of the new complementary color data for converting tone characteristics of the new complementary color data.

17. A color conversion method comprising the steps of:
generating a first calculation term which is effective for at least one of the hues of red, blue, green, cyan, magenta and yellow, based on color data representing colors of red, blue, and green;
generating a second calculation term which is effective for a predetermined inter-hue region included in at least one of inter-hue zones of red-yellow, yellow-green, green-cyan, cyan-blue, blue-magenta and magenta-red, based on the first calculation term;
generating matrix coefficients for said first calculation term, and said second calculation term;
generating new color data corresponding to said color data, by means of matrix calculation using said matrix coefficients, said first calculation term, and said second calculation term; and
designating the inter-hue zone and the inter-hue region for which said second calculation term is effective.

18. The color conversion method according to claim 17, wherein said step of generating said first calculation term comprises the steps of:
generating a maximum value and a minimum value of said color data; and
generating said first calculation term based on said color data, said maximum value and said minimum value.

19. The color conversion method according to claim 17, wherein said first calculation term is generated after tone characteristics of the color data is converted.

20. The color conversion method according to claim 17, wherein tone characteristics of the new color data is converted.

21. A color conversion method comprising the steps of:
calculating complementary color data representing cyan, magenta and yellow, based on color data representing red, green and blue;
generating a first calculation term which is effective for at least one of the hues of red, blue, green, cyan, magenta and yellow, based on the complementary color data;
generating a second calculation term which is effective for a predetermined inter-hue region included in at least one of inter-hue zones of red-yellow, yellow-green, green-cyan, cyan-blue, blue-magenta and magenta-red, based on the first calculation term;
generating matrix coefficients for said first calculation term, and said second calculation term;
generating new complementary color data corresponding to said complementary color data, by means of matrix calculation using said matrix coefficients, said first calculation term, and said second calculation term; and
designating the inter-hue zone and the inter-hue region for which said second calculation term is effective.

22. The color conversion method according to claim 21, wherein said step of generating said first calculation term comprises the steps of:
generating a maximum value and a minimum value of said complementary color data; and
generating said first calculation term based on said complementary color data, said maximum value and said minimum value.

23. The color conversion method according to claim 21, wherein the complementary color data is calculated after tone characteristics of the color data is converted.

24. The color conversion method according to claim 21, wherein tone characteristics of the new complementary color data is converted.

25. A color conversion method comprising the steps of:
generating a first calculation term which is effective for at least one of the hues of red, blue, green, cyan, magenta and yellow, based on color data representing colors of red, blue, and green;
generating a second calculation term which is effective for a predetermined inter-hue region included in at least one of inter-hue zones of red-yellow, yellow-green, green-cyan, cyan-blue, blue-magenta and magenta-red, based on the first calculation term;
calculating achromatic data representing an achromatic component of said color data;
generating matrix coefficients for said first calculation term, said second calculation term, and said achromatic data;
generating new color data corresponding to said color data, by means of matrix calculation using said matrix coefficients, said first calculation term, said second calculation term, and said achromatic data; and
designating the inter-hue zone and the inter-hue region for which said second calculation term is effective.

26. The color conversion method according to claim 25, wherein said step of generating said first calculation term comprises the steps of:

generating a maximum value and a minimum value of said color data; and generating said first calculation term based on said color data, said maximum value and said minimum value.

27. The color conversion method according to claim 25, wherein said first calculation term is generated after tone characteristics of the color data is converted.

28. The color conversion method according to claim 25, wherein tone characteristics of the new color data is converted.

29. A color conversion method comprising the steps of:

calculating complementary color data representing cyan, magenta and yellow, based on color data representing red, blue and green;

generating a first calculation term which is effective for at least one of the hues of red, blue, green, cyan, magenta and yellow, based on the complementary color data;

generating a second calculation term which is effective for a predetermined inter-hue region included in at least one of inter-hue zones of red-yellow, yellow-green, green-cyan, cyan-blue, blue-magenta and magenta-red, based on the first calculation term;

calculating achromatic data representing an achromatic component of said color data;

generating matrix coefficients for said first calculation term, said second calculation term, and said achromatic data;

generating new complementary color data corresponding to said complementary color data, by means of matrix calculation using said matrix coefficients, said first calculation term, said second calculation term, and said achromatic data; and designating the inter-hue zone and the inter-hue region for which said second calculation term is effective.

30. The color conversion method according to claim 29, wherein said step of generating said first calculation term comprises the steps of:

generating a maximum value and a minimum value of said complementary color data; and generating said first calculation term based on said complementary color data, said maximum value and said minimum value.

31. The color conversion method according to claim 29, wherein the complementary color data is calculated after tone characteristics of the color data is converted.

32. The color conversion method according to claim 29, wherein tone characteristics of the new complementary color data is converted.

* * * * *